US012658610B2

(12) United States Patent
Takasu et al.

(10) Patent No.: US 12,658,610 B2
(45) Date of Patent: Jun. 16, 2026

(54) CABLE CONNECTION MEMBER AND CABLE CONNECTION STRUCTURE

(71) Applicant: 3M INNOVATIVE PROPERTIES COMPANY, St. Paul, MN (US)

(72) Inventors: Kengo Takasu, Yokohama-City (JP); Dai Horibe, Sagamihara (JP); Tsunehisa Nakamura, Tokyo (JP)

(73) Assignee: 3M Innovative Properties Company, St. Paul, MN (US)

(*) Notice: Subject to any disclaimer, the term of this patent is extended or adjusted under 35 U.S.C. 154(b) by 176 days.

(21) Appl. No.: 18/567,826

(22) PCT Filed: May 25, 2022

(86) PCT No.: PCT/IB2022/054929
§ 371 (c)(1),
(2) Date: Dec. 7, 2023

(87) PCT Pub. No.: WO2022/259075
PCT Pub. Date: Dec. 15, 2022

(65) Prior Publication Data
US 2024/0213695 A1 Jun. 27, 2024

(30) Foreign Application Priority Data
Jun. 9, 2021 (JP) ................................ 2021-096725

(51) Int. Cl.
*H01R 4/70* (2006.01)

(52) U.S. Cl.
CPC .................................... *H01R 4/70* (2013.01)

(58) Field of Classification Search
CPC .......... H01R 4/70; H01R 4/72; H02G 15/182; H02G 15/1833; H02G 15/184; H02G 15/18; H02G 15/10; H02G 1/06; H02G 1/14; H02G 15/02; H02G 15/117; H01B 13/26; H01B 7/00; H01B 7/02; G01R 31/12
USPC ... 174/139, 650, 137, 138 R, 73.1, 74 R, 93, 174/77 R; 277/314, 312
See application file for complete search history.

(56) References Cited

U.S. PATENT DOCUMENTS 5,661,842 A * 8/1997 Faust .................... H02G 15/14 174/93
7,511,222 B2 * 3/2009 Taylor ............... H02G 15/1826 29/605
7,705,085 B2 * 4/2010 Bandyopadhyay ...... C08K 5/14 174/93

(Continued)

FOREIGN PATENT DOCUMENTS

EP 1852949 A1 11/2007
JP 09224322 A 8/1997

(Continued)

OTHER PUBLICATIONS

International Search Report for PCT International Application No. PCT/CN2021/102717, mailed on Sep. 6, 2022, 4 pages.

(Continued)

*Primary Examiner* — Angel R Estrada
(74) *Attorney, Agent, or Firm* — Gregg H. Rosenblatt

(57) ABSTRACT

A cable connection member comprises a cold shrink tube, an impervious layer provided inside the cold shrink tube, and a cushion layer provided inside the cold shrink tube and bonded to an entire surface of the impervious layer.

15 Claims, 16 Drawing Sheets

(56) References Cited

U.S. PATENT DOCUMENTS

| | | | | |
|---|---|---|---|---|
| 7,863,521 | B2 * | 1/2011 | Campbell .......... | H02G 15/1826 174/93 |
| 11,065,807 | B2 * | 7/2021 | Fripp ...................... | E21B 33/12 |
| 2008/0135288 | A1 | 6/2008 | Taylor et al. | |
| 2010/0132976 | A1 | 6/2010 | Tognali et al. | |

FOREIGN PATENT DOCUMENTS

| | | | |
|---|---|---|---|
| JP | 11313435 | A2 | 11/1999 |
| JP | 2000106228 | A | 4/2000 |
| JP | 2001231150 | A | 8/2001 |
| JP | 2002015790 | A | 1/2002 |
| JP | 2002095124 | A | 3/2002 |
| JP | 2003028912 | A | 1/2003 |
| JP | 2004201378 | A | 7/2004 |
| JP | 2006020388 | A2 | 1/2006 |
| JP | 2006050849 | A2 | 2/2006 |
| JP | 3895682 | B2 | 3/2007 |
| JP | 4278815 | B2 | 6/2009 |
| JP | 4762819 | B2 | 8/2011 |
| JP | 2011172313 | A | 9/2011 |
| JP | 2012060755 | A | 3/2012 |
| JP | 5087662 | B2 | 12/2012 |
| JP | 2022103987 | A | 7/2022 |
| KR | 1020180130161 | A | 12/2018 |

OTHER PUBLICATIONS

Extended EP Search Report for Appl. No. EP22819706.7, mailed on Mar. 13, 2025, 10 pp.

* cited by examiner

CABLE CONNECTION MEMBER AND CABLE CONNECTION STRUCTURE

TECHNICAL FIELD

The present disclosure relates to a cable connection member and a cable connection structure.

BACKGROUND

Patent Document 1 describes an impervious cold shrinkable tube. The impervious cold shrinkable tube includes a disassemblable tubular core, two layers of cold shrinkable tube layers supported on the tubular core with diameters elastically expanded, an impervious layer, and an adhesive layer. The impervious layer is formed by wrapping a metal foil in a tubular shape in a circumferential direction and overlapping both side edges that are opposed of the metal foil, and is interposed between the two layers of the cold shrinkable tube layers. The adhesive layer is formed by adhering to inner and outer peripheral surfaces of the impervious layer, and brings the impervious layer into close contact with the cold shrinkable tube layers.

Patent Document 2 describes an impervious tube. The impervious tube is an impervious tube provided with an impervious layer formed by forming a metal foil on which a rubber or a plastic film is layered in a cylindrical shape such that both side edges overlap and fusing or bonding the overlapping portions. A non-permeable cushion layer made of an olefin-based foam material is layered on the inner surface of the impervious layer. An adhesive seal layer is provided on the inner surface of the cushion layer at the end portion of the impervious tube, and is attached to an outer periphery of a cable connection portion for use.

CITATION LIST

Patent Literature

Patent Document 1: JP 2001-231150 A
Patent Document 2: JP 2004-201378 A

SUMMARY

Technical Problem

In the case of a cable connection member including a cold shrink tube and an impervious layer made of a metal foil, there is a concern that when the cold shrink tube is shrunk, the impervious layer bends and a hole is formed in the impervious layer. The hole in the impervious layer fails to obtain desired moisture-proof performance. In the impervious tube described above, the cushion layer is layered on the inner surface of the impervious layer. However, even in the impervious tube provided with the cushion layer, there is still a concern that when the tube is shrunk, the impervious layer bends and a hole is formed in the impervious layer. Therefore, reducing the bending of the impervious layer is requested.

Solution to Problem

A cable connection member according to the present disclosure includes a cold shrink tube, an impervious layer, and a cushion layer. The impervious layer is provided inside the cold shrink tube. The cushion layer is provided inside the cold shrink tube and bonded to an entire surface of the impervious layer.

The cable connection member can increase impermeability. Since the cushion layer is bonded to the impervious layer, bending of the impervious layer that possibly occurs when the cold shrink tube shrinks can be reduced with the cushion layer. That is, even when the impervious layer bends, a decrease in functionality of the impervious layer due to, for example, formation of a hole in the impervious layer can be suppressed.

The cushion layer may have a thickness of 1 mm or more and 5 mm or less.

The cushion layer may have a 25% compressive stress of 30 $N/cm^2$ or less.

A base material of the cushion layer may have a shear strength of 150 $N/cm^2$ or more.

The cushion layer may have a compression set of 80% or less.

The cushion layer may be configured by a foam tape.

The impervious layer may be configured by a layered body of a metal and a resin.

The cold shrink tube may constitute an insulating tube of a cable connection portion attached to an end portion of a cable.

The cushion layer may be provided inside the cold shrink tube. The impervious layer may be provided inside the cushion layer.

The cold shrink tube may include an inner layer and an outer layer located outside the inner layer. The cushion layer and the impervious layer may be provided between the inner layer and the outer layer.

A cable connection structure according to the present disclosure includes a cold shrink tube, an impervious layer, and a cushion layer. The cold shrink tube of an insulating tube of a cable connection portion is attached to an end portion of a cable. The impervious layer is provided inside the cold shrink tube. The cushion layer is provided inside the cold shrink tube and bonded to an entire surface of the impervious layer.

In this cable connection structure, the impervious layer is provided inside the cold shrink tube of the insulating tube, and thus impermeability in the insulating tube can be enhanced. Since the cushion layer is bonded to the impervious layer, bending of the impervious layer can be reduced with the cushion layer. That is, even when the impervious layer bends, a decrease in functionality of the impervious layer due to, for example, formation of a hole in the impervious layer can be suppressed.

The cable connection structure described above may include an outer cold shrink tube, a cushion layer, and an impervious layer. The outer cold shrink tube may cover at least a portion of the cable connection portion. The cushion layer may be provided inside the outer cold shrink tube. The impervious layer may be provided inside the cushion layer.

The cable connection structure described above may include an inner cold shrink tube provided inside the outer cold shrink tube. The inner cold shrink tube may include an inner layer and an outer layer located outside the inner layer. The inner cold shrink tube may include an impervious layer provided between the inner layer and the outer layer and a cushion layer provided between the outer layer and the impervious layer.

The cable connection structure described above may include a sheath cover member that covers the outer cold shrink tube and a cable sheath of the cable.

A cable connection structure according to another aspect of the present disclosure includes a cable connection portion attached to an end portion of a cable. The cable connection structure includes a sheath cover member that covers a cable sheath of the cable and the cable connection portion. This cable connection structure includes the sheath cover member that covers the cable sheath and the cable connection portion. Accordingly, the sheath cover member covering the cable sheath allows suppressing shrink back as a phenomenon in which the cable sheath shrinks in a longitudinal direction of the cable.

The cable connection structure described above may include a band member attached to the cable sheath and located inside the sheath cover member.

Advantageous Effects of Invention

According to the present disclosure, a cold shrink tube, for example, that have an impervious layer built-in and suppresses a decrease in functionality can be provided.

DETAILED DESCRIPTION

Figure 1:
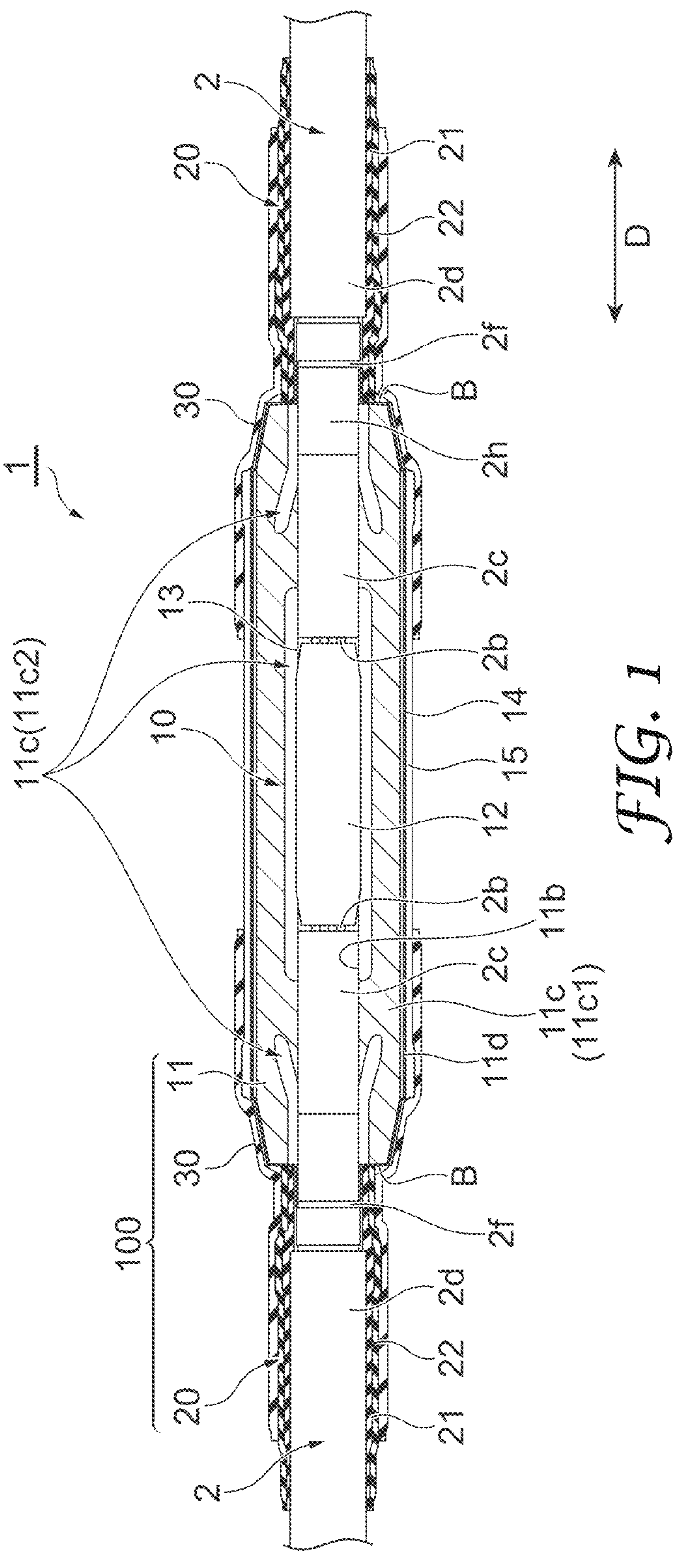
FIG. 1 is a cross-sectional view illustrating an example of a cable connection structure according to an embodiment.

The following will describe details of embodiments of a cable connection structure, a cable connection member, an inner cold shrink tube (Inner Pre-Stretched Tube, Inner Cold Shrink PST Tube), and an outer cold shrink tube (Outer Pre-Stretched Tube, Outer Cold Shrink PST Tube) according to the present embodiment with reference to the drawings. In the description of the drawings, the same or corresponding elements are denoted by the same reference signs, and redundant description will be appropriately omitted. In addition, the drawings may be simplified or exaggerated in part for ease of understanding, and the dimensional ratios, etc. are not limited to those illustrated in the drawings.

First, the term "cable" used herein includes a power cable such as a CVT cable, an insulated wire, and a communication cable, and encompasses a wide variety of cables. "Cable Connection Portion" includes a connection portion that connects a plurality of cables one another, and the periphery of the connection portion, a connection portion that connects each of the cables and a connector, and the periphery of the connection portion, and a connection portion that connects the cable and equipment other than the connector, and the periphery of the connection portion. The term "inside" according to the present disclosure refers to a cable side in a member covering the cable, that is, the inside of the cable in the radial direction. The "outside" refers to an opposite side of the cable in the member covering the cable, that is, the outside of the cable in the radial direction.

As illustrated in FIG. 1, a cable connection structure 1 according to the present embodiment includes a pair of cables 2, a cable connection portion 10 connecting the pair of cables 2 together, a pair of inner cold shrink tubes 20 covering the cables 2, and a pair of outer cold shrink tubes 30 covering the cable connection portion 10 and the inner cold shrink tubes 20. The cable 2 is, as an example, a power cable of rated 66 kV. However, the cable 2 may be a power cable of 6 kV, 22 kV, or 33 kV. The cable 2 includes, for example, a conductor 2*b*, an insulating layer 2*c* covering the conductor 2*b*, an external semi-conductive layer 2*h* covering the insulating layer 2*c*, a shielding copper tape 2*f* covering the external semi-conductive layer 2*h*, and a cable sheath 2*d* covering the shielding copper tape 2*f*. The conductor 2*b* has a cross-sectional area of, as an example, 80 ($mm^2$) or more and 600 ($mm^2$) or less, and the cable connection portion 10 has an outer diameter (diameter) of 90 (mm) or more. The cable connection portion 10 has, for example, a larger outer diameter than the cable 2.

The outer diameter of the cable connection portion 10 may have a lower limit of 100 (mm), 110 (mm), 120 (mm), or 130 (mm). The outer diameter of the cable connection portion 10 may have an upper limit of 200 (mm), 170 (mm), or 150 (mm). For example, the outer diameter of the cable connection portion 10 is 135 (mm) or more and 145 (mm) or less. However, the outer diameter of the cable connection portion 10 is not limited to the values described above, and is not particularly limited.

The cable connection portion 10 is provided at the end portions of the cables 2, and, for example, connects the end portions of the pair of cables 2 to one another. One of the cables 2, the cable connection portion 10, and the other cable 2 are disposed in alignment along a longitudinal direction D of the cable connection structure 1. A cable connection member 100 according to the present embodiment includes, for example, an insulating tube 11 constituting the cable connection portion 10, the inner cold shrink tubes 20 covering portions adjacent to the cable connection portion 10, and the outer cold shrink tubes 30 covering the cable connection portion 10 and the inner cold shrink tubes 20. However, the cable connection member 100 may include one or two of the insulating tube 11, the inner cold shrink tubes 20, and the outer cold shrink tubes 30.

Figure 2A:
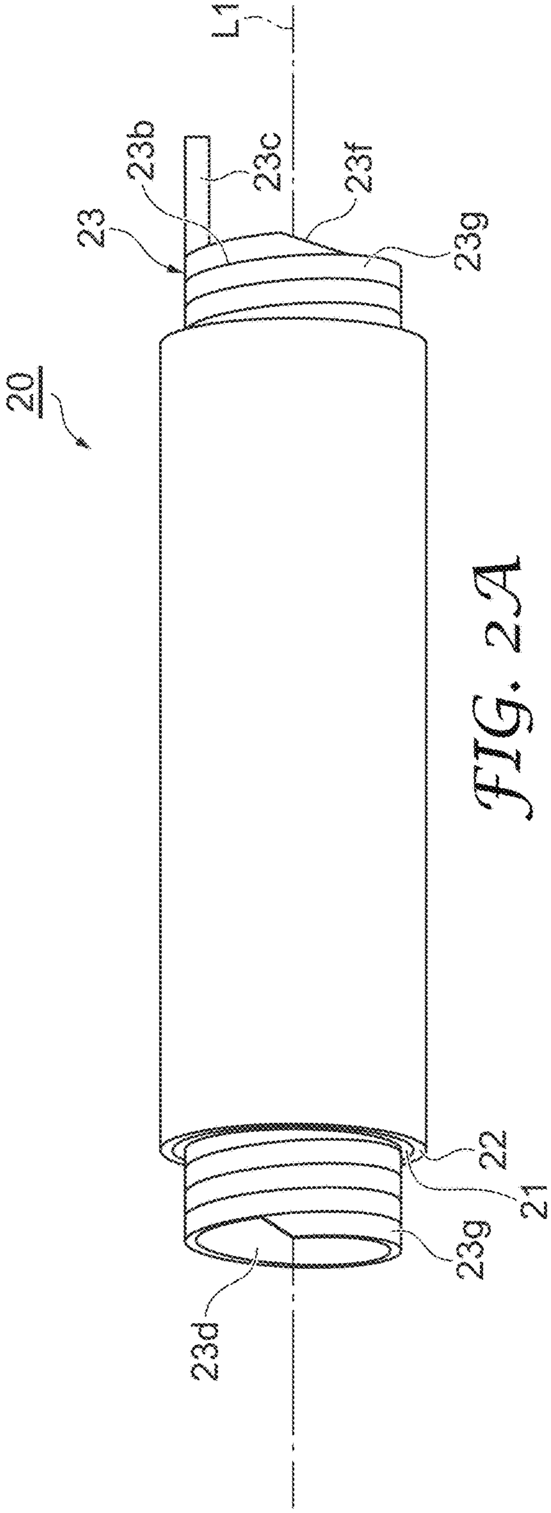
FIG. 2A is a drawing illustrating an example of an inner cold shrink tube according to an embodiment.
Figure 2B:
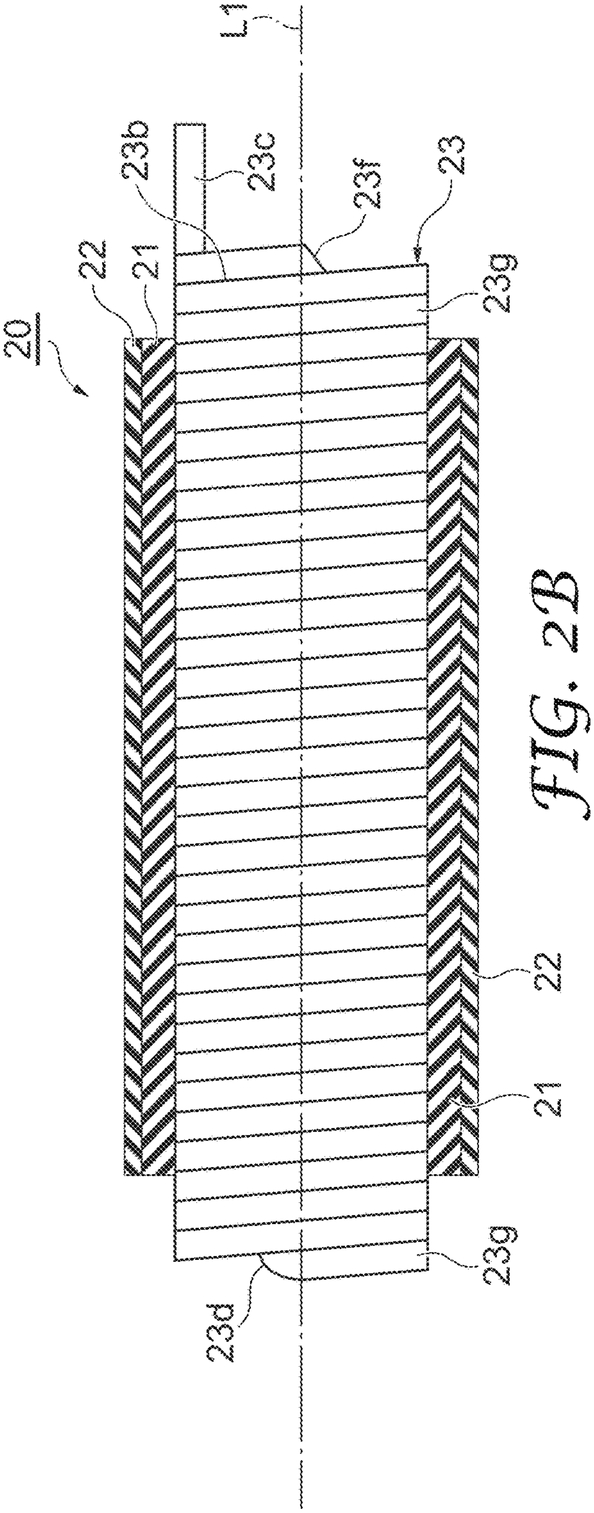
FIG. 2B is a cross-sectional view illustrating an example of the inner cold shrink tube according to an embodiment.

FIG. 2A is a perspective view illustrating an appearance of the inner cold shrink tube 20 as an example. FIG. 2B is a schematic cross-sectional view of the inner cold shrink tube 20. As illustrated in FIG. 2A and FIG. 2B, the inner cold shrink tube 20 includes an inner layer 21 and an outer layer 22 covering the inner layer 21. The inner layer 21 and the outer layer 22 are separable from one another, for example.

The inner cold shrink tube 20 may include an expanded diameter holding member 23 that holds the inner layer 21 and the outer layer 22 with diameters expanded. The expanded diameter holding member 23 includes a disassembly line 23*b* formed in a direction in which the axis L1 of the expanded diameter holding member 23 extends (hereinafter, also referred to as an axial direction). The expanded diameter holding member 23 is, for example, a cylindrical, tubular hollow member. The disassembly line 23*b* is formed such that the line advances gradually in the axial direction while revolving or revolving and reversing around the axis L1 of the expanded diameter holding member 23.

As a material of the expanded diameter holding member 23, a resin material, such as polyethylene or polypropylene, is used, for example. The expanded diameter holding member 23 can be pulled out along the disassembly line 23*b* as a core ribbon 23*c* that has a string-like body. The portion where the disassembly line 23*b* is formed is thinner than the remaining surrounding portion, and is easily ruptured.

The disassembly line is not limited to an aspect in which the disassembly line is spirally formed like the disassembly line 23*b*, and, for example, may be formed in an SZ shape, or can have any shape as long as the expanded diameter holding member 23 can be pulled out. Pulling the core ribbon 23*c* sequentially ruptures the expanded diameter holding member 23 along the disassembly line 23*b*, and is continuously pulled out as the new core ribbon 23*c*. The disassembly line 23*b* is formed, for example, with a constant pitch, and in this case, the width of the core ribbon 23*c* pulled out is constant. However, the width of the core ribbon 23*c* need not be constant.

The disassembly line 23*b* may be formed only on an inner circumferential surface of the expanded diameter holding member 23, or may be formed only on an outer circumferential surface of the expanded diameter holding member 23, or may be formed on both the inner circumferential surface and the outer circumferential surface of the expanded diameter holding member 23. The expanded diameter holding member 23 with the disassembly line 23*b* may be manufactured, for example, by spirally turning the disassembly line 23*b*, while fixing adjacent portions of the disassembly line 23*b* one another by bonding, welding, engagement, or a combination thereof, or may be manufactured by directly forming the disassembly line 23*b* in a cylindrical member.

As described above, the tubular, hollow expanded diameter holding member that can be pulled out may be in an aspect in which the core ribbon 23*c* is pulled to sequentially shrink the inner cold shrink tube as is the case with the expanded diameter holding member 23, or in an aspect in which the expanded diameter holding member slides relative to the inner cold shrink tube and is pulled out from the inner cold shrink tube to be separated. The expanded diameter holding member 23 includes a first end portion 23*d* corresponding to a start point side for pulling out the expanded diameter holding member 23 as the core ribbon 23*c*, and a second end portion 23*f* corresponding to an end point side for pulling out the expanded diameter holding member 23 as the core ribbon 23*c*. In the vicinity of the first end portion 23*d*, an exposed portion 23*g* is formed in which the inner cold shrink tube 20 is not installed, with the outer circumferential surface of the expanded diameter holding member 23 exposed, and the exposed portion 23*g* is also formed in the vicinity of the second end portion 23*f*.

The core ribbon 23*c* disassembled from the first end portion 23*d* is passed through the inside of the expanded diameter holding member 23 and pulled out from the second end portion 23*f* side. The core ribbon 23*c* is pulled out on the second end portion 23*f* side, and thus the expanded diameter holding member 23 is sequentially disassembled from the first end portion 23*d* toward the second end portion 23*f*. In the present embodiment, the core ribbon 23*c* is formed all over the length in the axial direction, and thus the expanded diameter holding member 23 can be completely disassembled from the first end portion 23*d* to the second end portion 23*f*. However, the disassembly line 23*b* only needs to be formed in at least a portion of the expanded diameter holding member 23 in which the inner cold shrink tube 20 is held with an expanded diameter, and, for example, a portion where the disassembly line 23*b* is not formed may be present in a predetermined region on the second end portion 23*f* side.

For example, the inner cold shrink tube 20 is a member held with an expanded diameter on the outer circumference side of the expanded diameter holding member 23. The inner cold shrink tube 20 covers a portion of the cable 2 located adjacent to the cable connection portion 10. For example, the inner peripheral surface of the inner layer 21, the outer peripheral surface of the inner layer 21, the inner peripheral surface of the outer layer 22, and the outer peripheral surface of the outer layer 22 have smooth surfaces. The "smooth surface" refers to a smooth surface that does not have a pointed portion or an unevenness portion.

Each of the inner layer 21 and the outer layer 22 is formed of, for example, a rubber that shrinks at normal temperature and has excellent stretching properties. Each of the inner layer 21 and the outer layer 22 is made of, for example, a material having waterproof properties. In this regard, "has waterproof properties" refers to a state in which an external liquid can be prevented from entering to inside with the inner cold shrink tube 20 being shrunk. "Has waterproof properties" refers to, for example, IPX7 specified in JIS C 0920 "degree of protection (IP code) provided by enclosure of electrical machinery and equipment" (when the article is immersed in water at a water depth of 1 m for 30 minutes, no water enters inside). The material of the inner layer 21 and the outer layer 22 is, for example, Ethylene Propylene Diene rubber (EPDM). The material of the inner layer 21 and the material of the outer layer 22 may be the same as or different from one another.

The thickness of the inner layer 21 is, for example, 4.5 (mm) or more and 8.5 (mm) or less. The thickness of the inner layer 21 may have a lower limit of 5 (mm), 5.5 (mm), 6 (mm), or 6.5 (mm). The thickness of the inner layer 21 may have an upper limit of 8 (mm), 7.5 (mm), or 7 (mm). Note that the value of the thickness of the inner layer 21 and the value of the thickness of the outer layer 22 are not limited to the respective examples described above, and are not particularly limited.

The inner layer 21 covers a portion of the cable 2 adjacent to the cable connection portion 10. For example, the inner layer 21 tightens the adjacent portion. As a result, a high tightening force can be exerted in the portion of the cable 2 adjacent to the cable connection portion 10. The outer layer 22 approaches the outer diameter of the inner cold shrink tube 20 to the outer diameter of the cable connection portion 10. "Approaches the outer diameter" means that the outer diameter of the inner cold shrink tube is set such that the outer diameter of the inner cold shrink tube becomes the same extent of the outer diameter of the cable connection portion, that is, the size of the outer diameter of the inner cold shrink tube is set so as to be the same extent of the outer diameter of the cable connection portion.

In the example of FIG. 1, the outer layer 22 thickens the inner cold shrink tube 20 such that the outer diameter of the inner cold shrink tube 20 is close to the outer diameter of the cable connection portion 10. That is, the portion of the outer layer 22 of the inner cold shrink tube 20 of the plurality of layers is thicker than the inner cold shrink tube of the single layer. Note that the single-layer inner cold shrink tube is equivalent to the inner cold shrink tube including only the inner layer 21 without the outer layer 22, for example. For the purpose of only approaching the outer diameter to the outer diameter of the cable connection portion 10, which has the large diameter, it is only necessary to use an inner cold shrink tube including only the further thick inner layer 21. However, the outer diameter of the cable connection portion 10 is not always limited to the large diameter, and is changed as appropriate.

Therefore, as in the present embodiment, in the case of the inner cold shrink tube 20 having the two-layer structure of the inner layer 21 and the outer layer 22, the outer layer 22 is attachable/removable in accordance with the outer diameter of the cable connection portion 10. This allows more reliably approaching the outer diameter of the inner cold shrink tube 20 to the outer diameter of the cable connection portion 10 by attachment/removal of the outer layer 22. The method of "approaching the outer diameter to the outer diameter of the cable connection portion," as illustrated in FIG. 1 as an example, the outer diameter may be approached to the outer diameter of the cable connection portion by providing the outer layer 22 or by removing the outer layer 22. In the example of FIG. 1, the outer diameter of the inner cold shrink tube 20 can be approached to the size of the outer diameter of the cable connection portion 10 with the outer layer 22, thus contributing to suppression of shrink back.

Figure 3A:
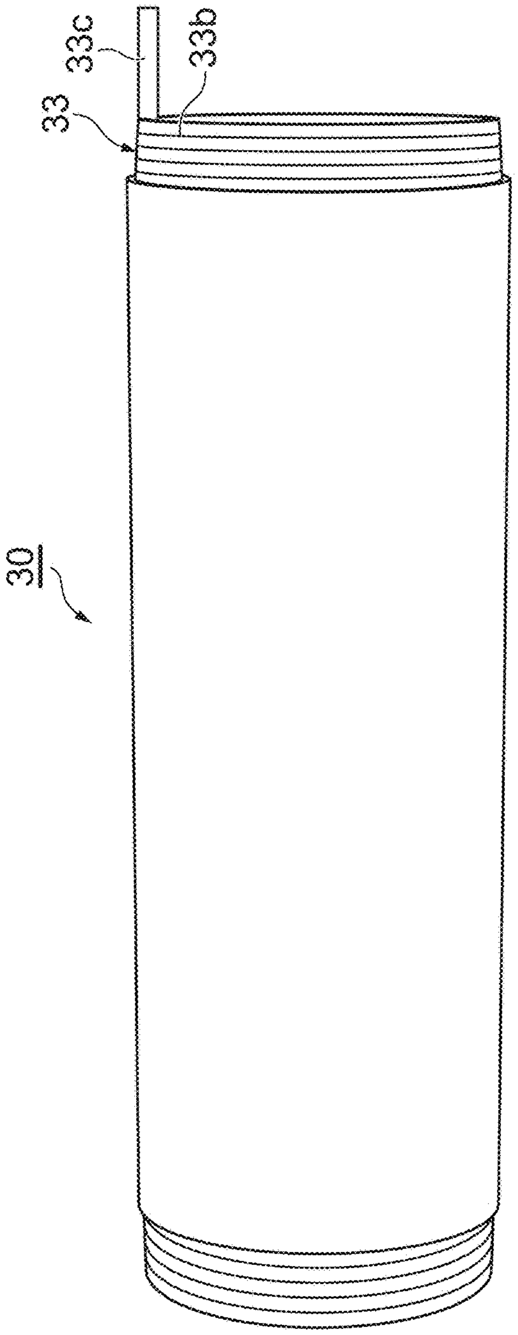
FIG. 3A is a drawing illustrating an example of an outer cold shrink tube according to an embodiment.
Figure 3B:
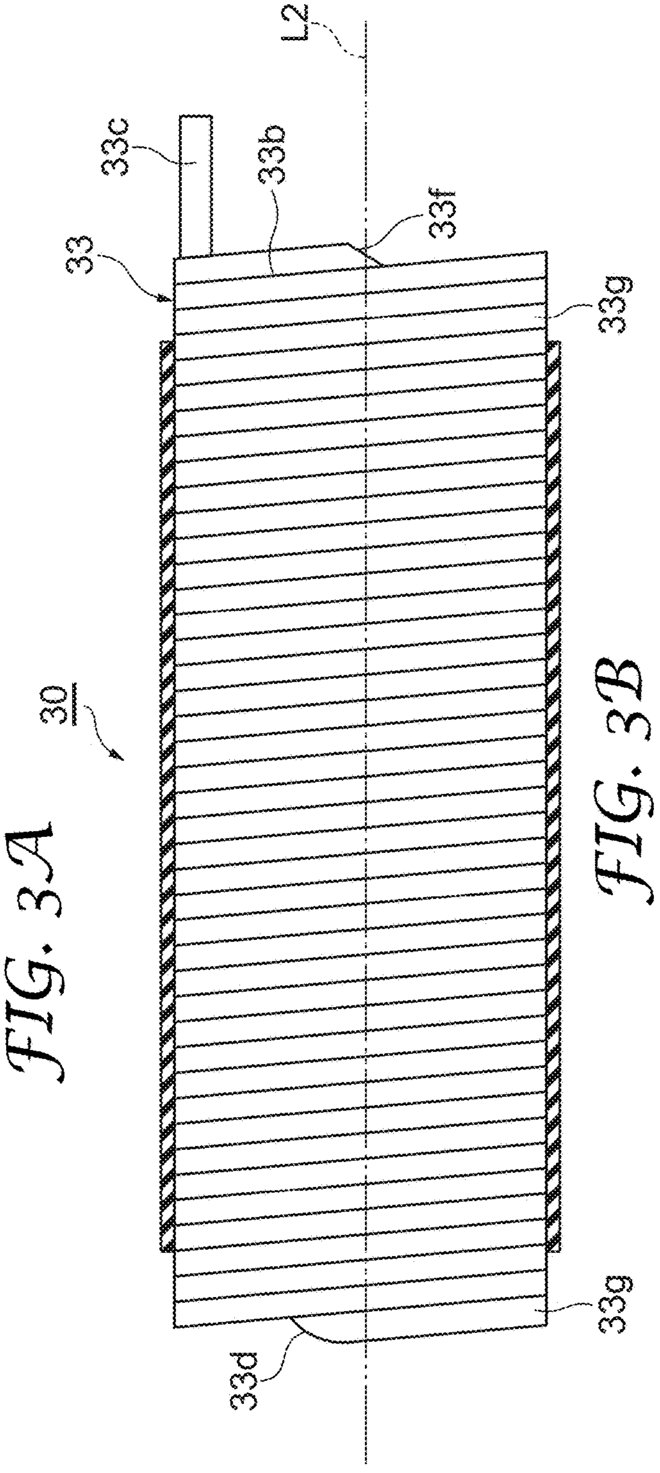
FIG. 3B is a cross-sectional view illustrating an example of the outer cold shrink tube according to an embodiment.

FIG. 3A is a drawing illustrating the outer cold shrink tube 30 according to an embodiment as an example. FIG. 3B is a cross-sectional view of the outer cold shrink tube 30 as an example. As illustrated in FIGS. 1, 3A and 3B, the outer cold shrink tube 30 covers the cable connection portion 10 and the inner cold shrink tube 20. The outer cold shrink tube 30 has a larger diameter (outer diameter and inner diameter) than that of the inner cold shrink tube 20. For example, the outer cold shrink tube 30 has a larger length in the axial direction (longitudinal direction) than that of the inner cold shrink tube 20.

For example, the outer cold shrink tube 30 covers at least a portion of the cable connection portion 10 and at least a portion of the inner cold shrink tube 20. The outer cold shrink tube 30 covers a region that includes a boundary portion B between the cable connection portion 10 and the inner cold shrink tube 20. For example, like the inner cold shrink tube 20, the outer cold shrink tube 30 is formed of a material having waterproof properties. The material of the outer cold shrink tube 30 is, for example, EPDM.

For example, before the outer cold shrink tube 30 covers the cable connection portion 10 and the inner cold shrink tube 20 (before installation and before use), the outer cold shrink tube 30 may be held around an outer circumference of an expanded diameter holding member 33 in a state in which the outer cold shrink tube 30 has an expanded diameter. Similar to the expanded diameter holding member 23 described above, the expanded diameter holding member 33 includes a disassembly line 33*b* formed in the direction in which the axis L2 extends, and can be pulled out along the disassembly line 33*b* as a core ribbon 33*c* that has a string-like body. Similar to the expanded diameter holding member 23 described above, the expanded diameter holding member 33 includes a first end portion 33*d* corresponding to a start point side for pulling out the expanded diameter holding member 33 as the core ribbon 33*c*, and a second end portion 33*f* corresponding to an end point side for pulling out the expanded diameter holding member 33 as the core ribbon 33*c*. In the vicinity of the first end portion 33*d*, an exposed portion 33*g* is formed in which the outer cold shrink tube 30 is not installed, with the outer surface of the expanded diameter holding member 33 exposed, and the exposed portion 33*g* is also formed in the vicinity of the second end portion 33*f*. Thus, the shape and material of the expanded diameter holding member 33 can, for example, be same as the shape and material of the expanded diameter holding member 23.

For example, the cable connection portion 10 includes the insulating tube 11, a connector 12, and a semi-conductive tape 13. The insulating tube 11 is configured as a tubular body including a hollow portion 11*b* that penetrates the cable 2 in the longitudinal direction D. The insulating tube 11 includes, for example, an insulating tube body 11*c* including the hollow portion 11*b*, a shield mesh 11*d*, an impervious layer 14, and a cold shrink tube 15. The insulating tube body 11*c* is, for example, an integrally molded article of rubber.

The insulating tube body 11*c* as an example may include insulating rubber, for example, ethylene propylene rubber or silicone rubber. For example, the insulating tube body 11*c* includes insulating rubber 11*cl* and conductive rubber 11*c*2. The conductive rubber 11*c*2 is provided, for example, at three locations including respective both end portions of the insulating tube body 11*c* in the longitudinal direction D and the center of the insulating tube body 11*c* in the longitudinal direction D. The shield mesh 11*d* covers at least a portion of the insulating tube body 11*c*. The impervious layer 14 covers the shield mesh 11*d*. For example, at least a portion of the shield mesh 11*d* is covered with the outer cold shrink tube 30.

Figure 4:
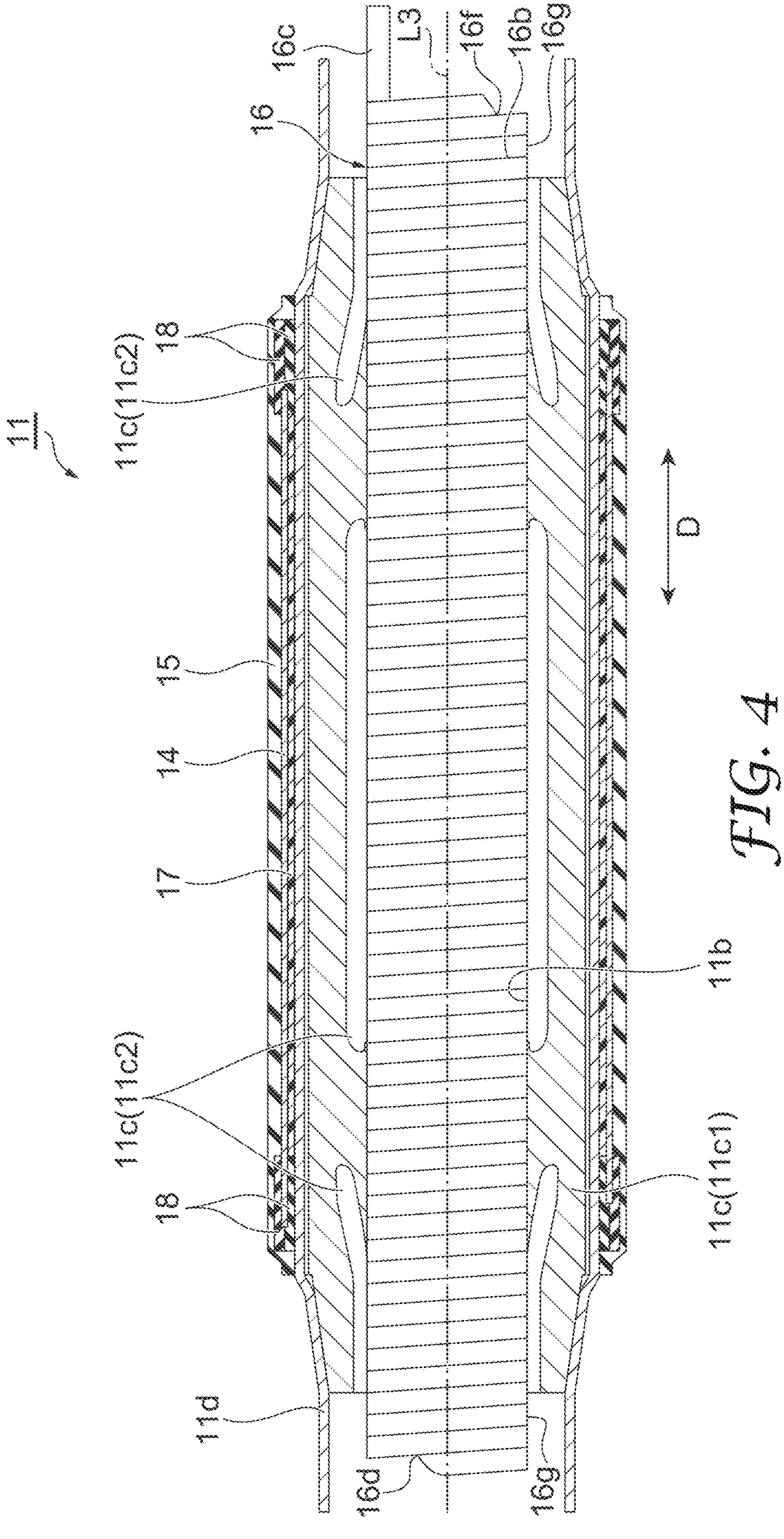
FIG. 4 is a cross-sectional view illustrating an insulating tube of a cable connection portion according to an embodiment as an example.

FIG. 4 is a cross-sectional view illustrating the insulating tube 11 as an example. For example, before installation (before use), the insulating tube 11 is held around the outer circumference of an expanded diameter holding member 16 in a state in which the insulating tube 11 has an expanded diameter. Similar to the expanded diameter holding member 23 described above, the expanded diameter holding member 16 includes a disassembly line 16*b* formed in the direction in which an axis L3 extends, and can be pulled out along the disassembly line 16*b* as a core ribbon 16*c* that has a string-like body.

The expanded diameter holding member 16 includes a first end portion 16*d* corresponding to a start point side for pulling out the expanded diameter holding member 23 as the core ribbon 16*c*, and a second end portion 16*f* corresponding to an end point side for pulling out the expanded diameter holding member 23 as the core ribbon 16*c*. In the vicinity of the first end portion 16*d*, an exposed portion 16*g* where the insulating tube 11 is not installed but the outer surface of the expanded diameter holding member 16 is exposed is formed, and the exposed portion 16*g* is also formed in the vicinity of the second end portion 16*f*. Thus, the shape and material of the expanded diameter holding member 16 can be same as the shape and material of the expanded diameter holding member 23.

The impervious layer 14 is provided inside the cold shrink tube 15. The material of the cold shrink tube 15 is, for example, EPDM. The impervious layer 14 is formed of, for example, a layered body of a metal and a resin. The impervious layer 14 contains aluminum as a metal, for example. However, the metal constituting the impervious layer 14 may contain nickel or copper, and is not particularly limited. When the impervious layer 14 includes a resin layer, corrosion of the metal constituting the impervious layer 14 is more reliably suppressed.

The impervious layer 14 has a function to prevent water infiltration from the outside to the inside (the insulating tube 11 side) of the cold shrink tube 15. When water infiltrates, for example, an adverse effect, such as causing a phenomenon referred to as a Water Tree, possibly occurs in the insulating layer 2*c*. The impervious layer 14 suppresses the adverse effect. The impervious layer 14 is formed of, for example, a layered body (also referred to as a metal laminated film) of a resin film and a metal foil. As an example, the impervious layer 14 may contain aluminum, and may be constituted by an aluminum laminated film. The impervious layer 14 may be formed by laminating a metal layer and a resin on the main surface of the metal layer. In the impervious layer 14, the resins may be laminated on both surfaces of the metal layer, or the resin may be laminated on one surface of the metal layer. However, laminating the resins on both surfaces of the metal layer of the impervious layer 14 allows providing satisfactory handleability of the impervious layer 14.

For example, the insulating tube 11 includes a cushion layer 17 provided inside (as an example, between the shield mesh 11*d* and the impervious layer 14) of the impervious layer 14, and putty materials 18 provided on respective both ends of the cushion layer 17 in the longitudinal direction D. The cushion layer 17 as an example is provided to reduce bending of the impervious layer 14 (for example, to avoid the bending angle to be an excessively steep angle or to avoid the curvature of the bending to be excessively large) that possibly occurs when the cold shrink tube 15 is shrunk. The putty material 18 is made of butyl, as an example.

The cushion layer 17 has a cushion property that deforms while having stress when a force is applied. The deformation is, for example, compression. For example, this allows reducing bending of creases due to shrinkage by partial deformation. For example, the cushion layer 17 may be made of a putty material. The cushion layer 17 may also be a foam tape made of a foamable material. As an example, the cushion layer 17 is made of butyl. The cushion layer 17 may be a strong adhesive foam tape. As an example, the cushion layer 17 is an acrylic foam tape. The foam tape of the cushion layer 17 may be constituted by a foam base material having a tackiness of a single layer, or a gluing agent layer may be provided on the main surface (for example, both surfaces) of the foam base material. The gluing agent layer of the cushion layer 17 may be, for example, a silicone-based gluing agent, in addition to an acrylic-based gluing agent.

Additionally, the cushion layer 17 is more preferably made of a material, such as a foam tape, that does not have excessively high flowability (does not easily flow when, for example, a shear force is applied due to, for example, flexure and can hold a positional relationship). In this case, since the cushion layer 17 does not flow by bending of the impervious layer 14, the cushion property can be exhibited in the positional relationship, and bending of the impervious layer 14 can be more reliably reduced.

The thickness of the cushion layer 17 is, for example, 1 mm or more and 5 mm or less. The thickness of the cushion layer 17 may be 1.1 mm or more or 1.2 mm or more. The thickness of the cushion layer 17 may be 4 mm or less or 3 mm or less. The cushion layer 17 having the thickness of a predetermined value or more allows reducing bending of the impervious layer 14. The cushion layer 17 having the thickness of the predetermined value or less allows providing satisfactory workability and cost reduction.

The 25% compressive stress of the cushion layer 17 is, for example, 30 $N/cm^2$ or less. The 25% compressive stress of the cushion layer 17 may be 20 $N/cm^2$ or less or may be 15 $N/cm^2$ or less. This makes it possible to exhibit the cushion property of deformation while having stress when a force is applied, thus ensuring reducing bending of the impervious layer 14. Here, the cushion layer 17 made of acrylic foam at 1.2 mm in thickness and the cushion layer 17 made of putty material at 1.5 mm in thickness were prepared. The 25% compressive stresses of the cushion layers 17 were measured from loads when the sizes of the respective cushion layers 17 were configured to be 25 mm×25 mm and at 25% compression.

The shear strength of the base material of the cushion layer 17 is, for example, 150 $N/cm^2$ or more. The shear strength may be 200 $N/cm^2$ or more or 300 $N/cm^2$ or more. It is preferable in that the shear strength being the predetermined value or more allows suppressing the flow of the cushion layer 17 by bending of the impervious layer 14 and holding the cushion layer 17. Here, the shear strength of the cushion layer indicates a value when the shear force is measured in the following method. 25 mm×50 mm (1.5 mm in thickness) of the cushion layers 17 (the putty materials) were stuck on both surfaces of 25 mm×50 mm (122 μm in thickness) of an aluminum laminated film (the impervious layer 14), it was sandwiched between stainless plates, a steel roller having a weight of 2 kg was moved back and forth on it once for pressure bonding, and it was cured for 24 hours at room temperature. After that, the force of the maximum stress when the base material stretched (at the time point of elongation at several %) when the stainless plates were pulled at a tensile speed of 30 mm/minute was measured as the shear strength.

The compression set of the cushion layer 17 is, for example, 80% or less. The compression set of the cushion layer 17 may be 70% or less or may be 60% or less. It is preferable in that the compression set being the predetermined value or less allows suppressing the flow of the cushion layer 17 by bending of the impervious layer 14 and holding the cushion layer 17. Here, for the compression set of the cushion layer 17, the cushion layer 17 having the diameter of 29 mm (each of the cushion layer 17 made of acrylic foam at 1.2 mm in thickness and the cushion layer 17 made of putty material at 1.5 mm in thickness) in a 25% compression state was left at room temperature for 24 hours, the thicknesses before and after the compression were measured, and the compression set was calculated from the following equation (1).

[Equation 1]

$$CS = \frac{h_0 - h_1}{h_0 - h_s} \times 100 \quad (1)$$

In Formula (1), CS indicates a compression set (%), $h_0$ indicates a thickness of a test specimen before compression (mm), $h_1$ indicates the thickness of the test specimen after removal from a compression device (mm), and $h_s$ indicates a thickness of a spacer (mm).

The cushion layer 17 is bonded to the entire surface of the impervious layer 14. In the present disclosure, "bonding" is bonding when an article itself is an adhesive (for example, a putty), bonding when an article itself includes a gluing agent (for example, a tape), or bonding when an adhesive is separately applied to an article, and "bonding" includes an aspect without using an adhesive, such as welding. In the present disclosure, first of all, "the entire surface of the impervious layer" only needs to be an entire surface of a region that functions as the impervious layer (for example, when a region includes a surplus region generated at, for example, an end portion due to a production reason, the region excluding the surplus region). Additionally, "bonding to the entire surface" also includes substantially the entire surface of the impervious layer and practically the entire surface of the impervious layer, in addition to 100%. For example, "bonding to the entire surface" includes a state in which portions where bonding is not performed are sparsely present in a small dot shape. Conversely, "bonding to the entire surface" does not include a case in which a portion in a large dot shape or a stripe shape where bonding is not performed is present and stress concentration caused by, for example, bending of the impervious layer occurs. For example, a state in which the region functioning as the impervious layer is bonded by the area 95% or more may also be "bonding to the entire surface."

Figure 5A:
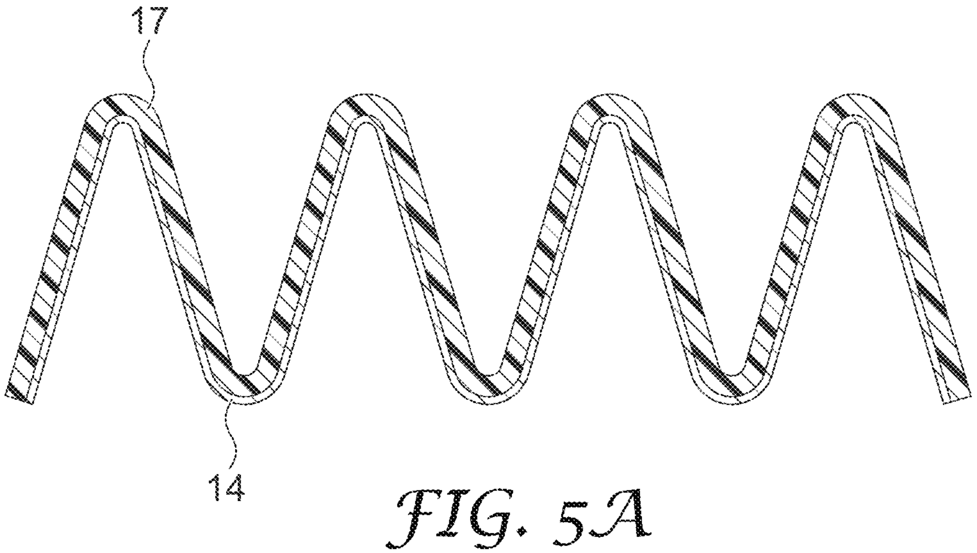
FIG. 5A is a drawing schematically illustrating a behavior of an impervious layer when a cushion layer is provided.
Figure 5B:
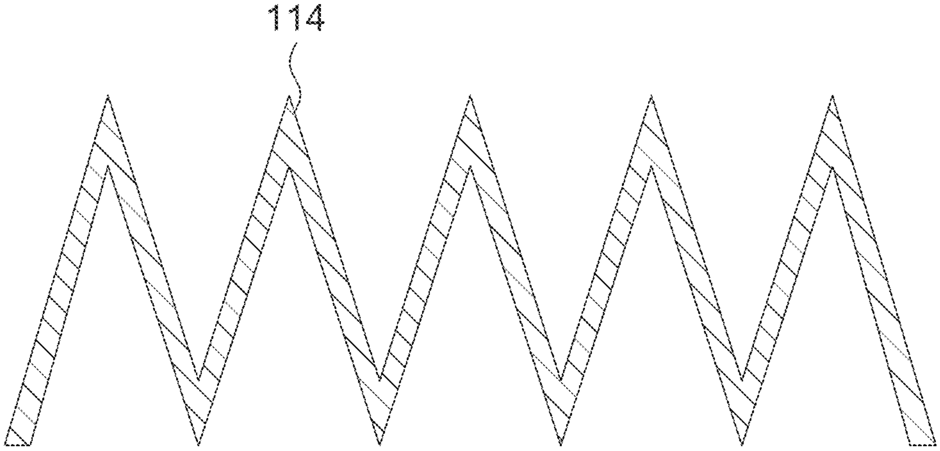
FIG. 5B is a drawing schematically illustrating a behavior of the impervious layer in a case where the cushion layer is not provided.

FIG. 5A is a drawing schematically illustrating a bending state of the impervious layer 14 when the cushion layer 17 is bonded to the entire surface of the impervious layer 14. FIG. 5B is a drawing schematically illustrating a bending state of an impervious layer 114 in a case where the cushion layer 17 is not bonded to the impervious layer 114. As illustrated in FIG. 5B, with the impervious layer 114 to which the cushion layer 17 is not bonded, there is a concern that the impervious layer 114 is bent during shrinkage of the cold shrink tube located outside the impervious layer 114, and a hole is formed in the impervious layer 114 in the bent portion of the impervious layer 114. As illustrated in FIG. 5A, when the cushion layer 17 is bonded to the entire surface of the impervious layer 14, bending of the impervious layer 14 during shrinkage of the cold shrink tube 15 located outside the impervious layer 14 is reduced. In other words, by bonding the cushion layer 17 to the entire surface of the impervious layer 14, the bending angle of the impervious layer 14 becomes gradual. Accordingly, when the cushion layer 17 is bonded to the entire surface of the impervious layer 14, bending of the impervious layer 14 can be reduced, and thus formation of a hole in the impervious layer 14 can be suppressed.

Figure 6:
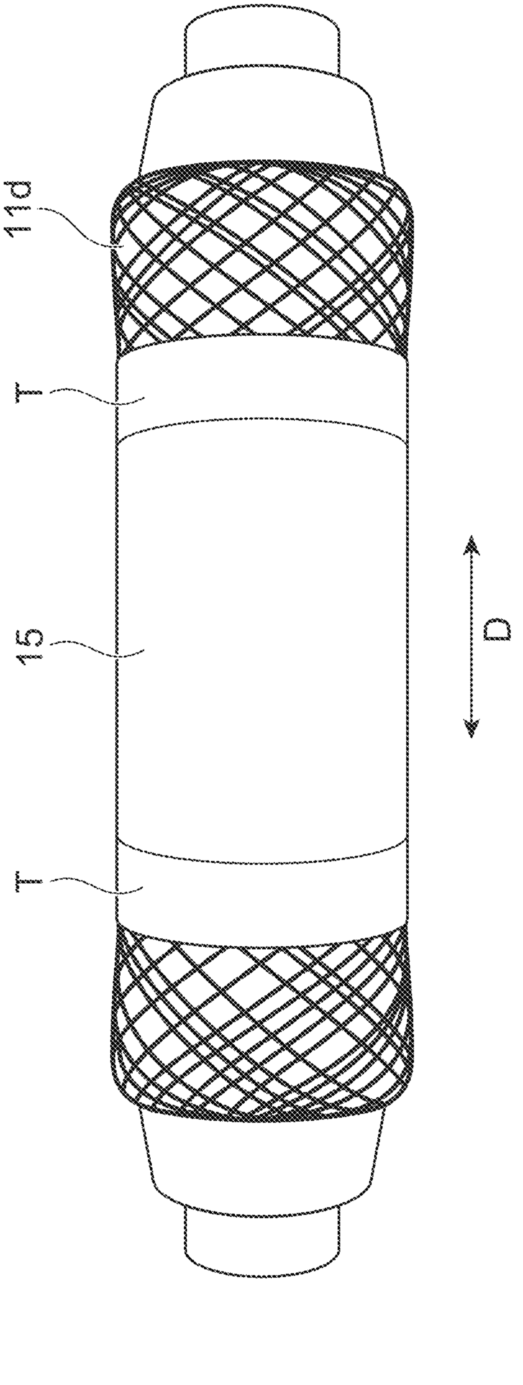
FIG. 6 is a drawing illustrating the insulating tube according to an embodiment.

FIG. 6 is a perspective view illustrating the insulating tube 11 of FIG. 4. As illustrated in FIG. 6, the insulating tube 11 includes the shield meshes 11*d*, which extend from the cold shrink tube 15 attached to the outside of the impervious layer 14 to both sides in the longitudinal direction D, formed by being folded back to the center side of the longitudinal direction D. Each of the shield meshes 11*d* folded back to the center side of the longitudinal direction D is fixed by winding with a tape T. Various tapes can be used as the tape T as long as the tape can fix the shield mesh 11*d* and can be peeled.

Next, effects obtained from the cable connection member 100 and the cable connection structure 1 according to the present embodiment will be described. The cable connection member 100 includes the impervious layer 14 inside the cold shrink tube 15, and thus impermeability can be enhanced. The cable connection member 100 includes the cushion layer 17 bonded to the impervious layer 14. The cushion layer 17 bonded to the impervious layer 14 can protect the impervious layer 14. Additionally, since the cushion layer 17 is bonded to the entire surface of the impervious layer 14, bending of the impervious layer 14 that possibly occurs when the cold shrink tube 15 shrinks can be reduced with the cushion layer 17. That is, even when the impervious layer 14 bends, the cushion layer 17 bonded to the entire surface of the impervious layer 14 can suppress formation of a hole in the impervious layer 14.

The thickness of the cushion layer 17 may be 1 mm or more and 5 mm or less. In this case, the thickness of the cushion layer 17 being 1 mm or more allows reducing bending of the impervious layer 14. The thickness of the cushion layer 17 being 5 mm or less allows avoiding the cushion layer 17 to be excessively thick.

The shear strength of the cushion layer 17 may be 150 $N/cm^2$ or more. In this case, the shear strength of the cushion layer 17 being 150 $N/cm^2$ or more allows increasing the strength of the cushion layer 17 and reducing bending of the impervious layer.

The cushion layer 17 may be configured by a foam tape. In this case, a foam tape having high shape maintainability in which flowability of the cushion layer 17 is low is used as the cushion layer 17. Accordingly, the change in shape of the cushion layer 17 due to the bending of the impervious layer 14 can be suppressed, thereby ensuring suppressing formation of a hole in the impervious layer 14 more reliably.

The impervious layer 14 may be configured by a layered body of a metal and a resin. In this case, protection of the metal of the impervious layer 14 by the resin allows providing the satisfactory handleability of the impervious layer 14.

The cold shrink tube 15 may constitute the insulating tube 11 of the cable connection portion 10 attached to the end portions of the cables 2. In this case, since the impervious layer 14 provided on the cold shrink tube 15 of the insulating tube 11 is protected by the cushion layer 17 to ensure suppressing formation of a hole in the impervious layer 14 of the insulating tube 11, the impermeability of the insulating tube 11 can be enhanced.

Figure 7:
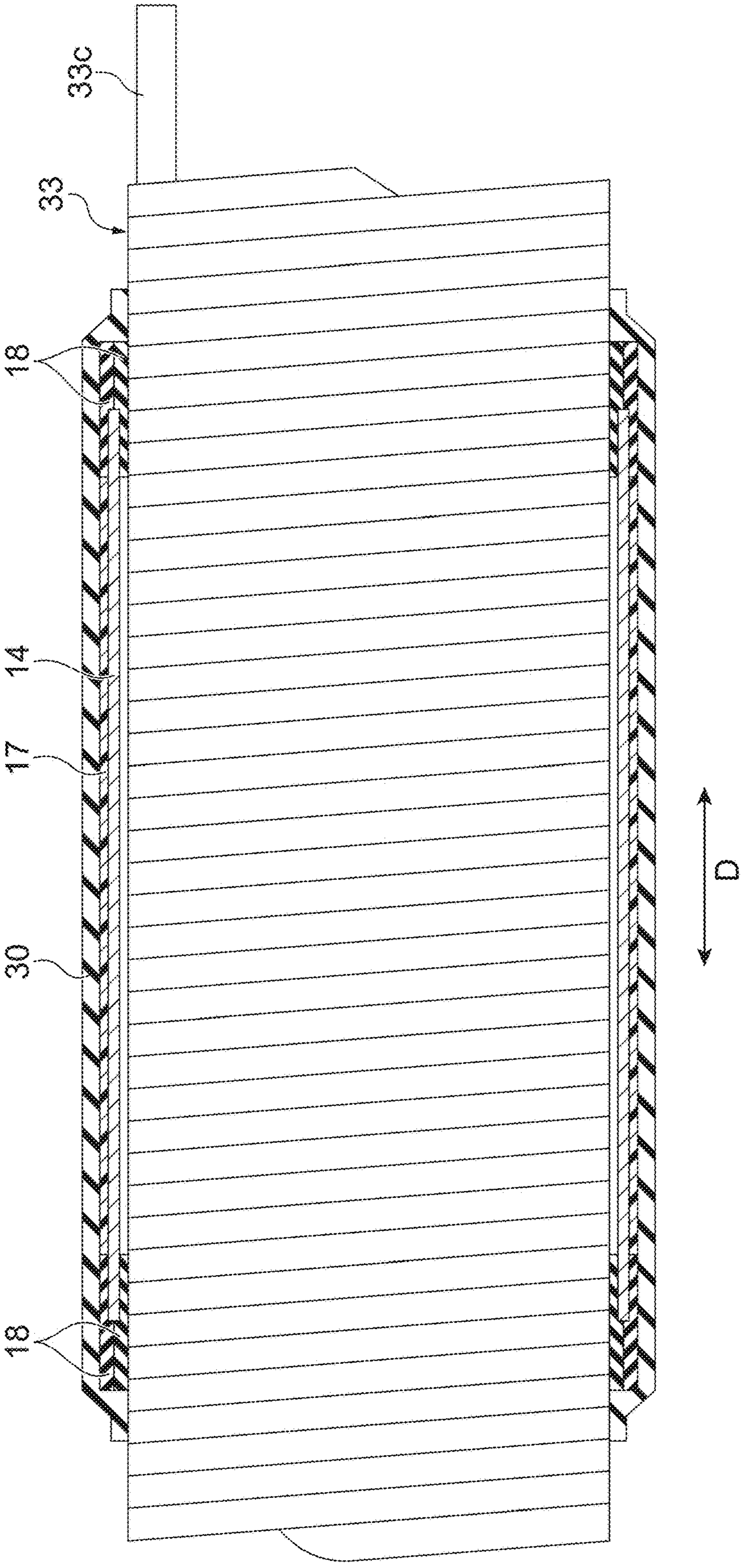
FIG. 7 is a cross-sectional view illustrating the outer cold shrink tube according to an embodiment.

The impervious layer 14 and the cushion layer 17 described above can be built in each of the outer cold shrink tube 30 and the inner cold shrink tube 20 described above. FIG. 7 is a cross-sectional view of the outer cold shrink tube 30 illustrating a state in which the impervious layer 14 and cushion layer 17 are built in the outer cold shrink tube 30 in FIG. 3. As illustrated in FIG. 7, the impervious layer 14 is provided inside the cushion layer 17. The cushion layer 17 is bonded to the entire surface of the impervious layer 14. The present embodiment shows an example of the outer cold shrink tube 30 as the single-layer outer cold shrink tube, and an example of the inner cold shrink tube 20 as the cold shrink tube of a plurality of layers. The single-layer cold shrink tube can be in a simple configuration. However, in the cold shrink tube having the plurality of layers, the impervious layer does contact a bonded matter, and therefore is, for example, advantageous of ensuring suppressing shrink back due to a slip of the aluminum laminated film.

The cushion layer 17 is disposed between the outer cold shrink tube 30 and the impervious layer 14. For example, when viewed from the impervious layer 14, the cushion layer 17 is disposed on the opposite side to the expanded diameter holding member 33. This allows suppressing that the cushion layer 17 adheres to the expanded diameter holding member 33 and the core ribbon 33*c* is less likely to be pulled. The putty materials 18 are provided on both ends of the cushion layer 17 in the longitudinal direction D.

As described above, in the cable connection member 100 according to the present embodiment, the cushion layer 17 may be provided inside the outer cold shrink tube 30, and the impervious layer 14 may be provided inside the cushion layer 17. In other words, the cable connection structure may include the outer cold shrink tube 30 covering at least a portion of the cable connection portion 10, the cushion layer 17 provided inside the outer cold shrink tube 30, and the impervious layer 14 provided inside the cushion layer 17.

In the example described above, the cushion layer 17 and the impervious layer 14 are provided inside the outer cold shrink tube 30, and thus bending of the impervious layer 14 located inside the outer cold shrink tube 30 can be reduced with the cushion layer 17, and impermeability can be further enhanced. An example in which the cushion layer 17 is provided outside the impervious layer 14 inside the outer cold shrink tube 30 has been described above. Note that the cushion layer 17 may be provided outside the impervious layer 14 inside the cold shrink tube other than the outer cold shrink tube 30 (for example, the cold shrink tube 15 or the inner cold shrink tube 20 described above).

Figure 8:
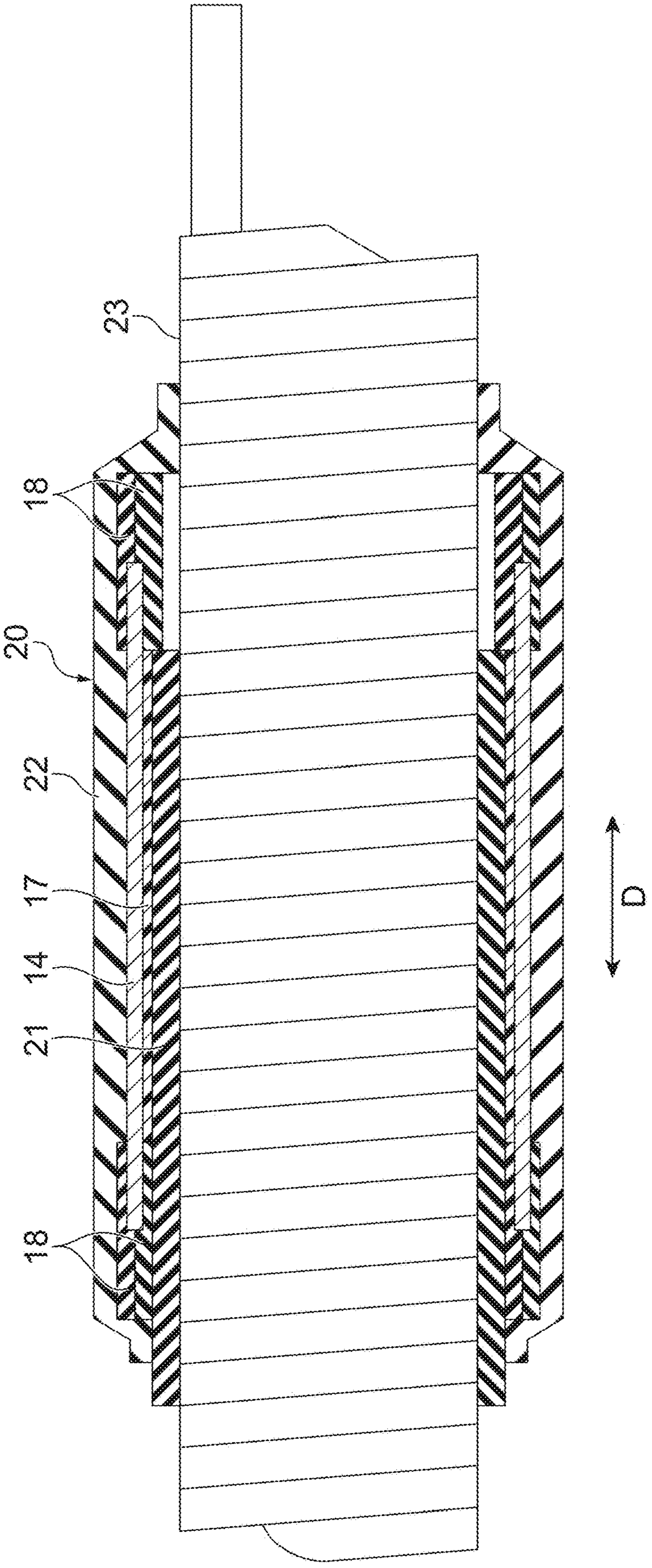
FIG. 8 is a cross-sectional view illustrating the inner cold shrink tube according to an embodiment.

Next, an example in which the impervious layer 14 and the cushion layer 17 are built in the inner cold shrink tube 20 will be described with reference to FIG. 8. FIG. 8 is a cross-sectional view of an inner cold shrink tube illustrating a state in which the impervious layer 14 and the cushion layer 17 are built in the inner cold shrink tube 20 of FIG. 2. As illustrated in FIG. 8, the impervious layer 14 is provided between the cushion layer 17 and the outer layer 22. The cushion layer 17 is provided between the inner layer 21 and the impervious layer 14. In other words, the inner layer 21, the cushion layer 17, the impervious layer 14, and the outer layer 22 are arranged in this order from the inside in the radial direction to the outside in the radial direction of the inner cold shrink tube 20. The putty materials 18 are provided on respective both end sides of the cushion layer 17 in the longitudinal direction D, and the putty materials 18 are provided on the outer surfaces and the inner surfaces of the respective both ends of the impervious layer 14 in the longitudinal direction D.

An example in which the impervious layer 14 and the cushion layer 17 are built in the cold shrink tube (the cold shrink tube 15, the inner cold shrink tubes 20, or the outer cold shrink tubes 30) has been described above. In this way, when the impervious layer 14 and the cushion layer 17 are built in the cold shrink tube, the impervious layer 14 can be formed together with attachment of the cold shrink tube. The impervious layer 14 can be formed together with the attachment of the cold shrink tube, and this allows eliminating the need for separately preparing an impervious layer or separately attaching an impervious layer, thereby allowing improving attachment of the cold shrink tube and workability of forming the impervious layer 14.

As described above, in the cable connection member 100 according to the present embodiment, the inner cold shrink tube 20 may include the inner layer 21 and the outer layer 22 located outside the inner layer 21. The cable connection structure 1 according to the present embodiment may include the inner cold shrink tubes 20 provided inside the outer cold shrink tubes 30. The inner cold shrink tube 20 may include the inner layer 21 and the outer layer 22 located outside the inner layer 21. The impervious layer 14 provided between the inner layer 21 and the outer layer 22, and the cushion layer 17 provided between the outer layer 22 and the impervious layer 14 may be provided.

In this case, the cushion layer 17 and the impervious layer 14 may be provided between the inner layer 21 and the outer layer 22. In this case, the inner cold shrink tube 20 has two layers, and the cushion layer 17 and the impervious layer 14 are provided between the two layers. Accordingly, it is possible to increase the strength of the cable connection portion 10 and enhance impermeability. In this case, the inner cold shrink tube 20 is provided inside the outer cold shrink tube 30, and the impervious layer 14 and the cushion layer 17 are provided between the inner layers 21 and the outer layers 22 of the inner cold shrink tubes 20. Accordingly, bending of the impervious layer 14 of the inner cold shrink tube 20 is reduced with the cushion layer 17, and thus impermeability can be further enhanced. Note that the inner cold shrink tube may have a single layer.

EXAMPLES

Next, the examples of the present embodiment will be described. Note that the present disclosure is not limited to the examples given below.

Heat Expansion/Shrinkage Test

The cable connection structure 1 was manufactured using the insulating tube 11 including the impervious layer 14, the inner cold shrink tubes 20 including the impervious layer 14, and the outer cold shrink tubes 30 including the impervious layer 14 described above. An aluminum laminated film was used as the impervious layer 14. A heat cycle test was conducted on the cable connection structure 1. The contents of heat cycle test are as follows.

Conductor cross-sectional area of the cable 2 to be connected: 100 $mm^2$

Conductor temperature: 90° ° C.

Energization time: 3 hours

Stop time: 3 hours

Number of cycles: 365 cycles (equivalent to 1 year)

The cable connection structure 1 was disassembled after completion of the test described above to confirm the situation of the impervious layer 14.

In addition, in the present test, the cushion layer 17 was not provided in the insulating tube 11, and the cushion layer 17 was bonded to the entire surface of the impervious layer 14 in the respective inner cold shrink tubes 20 and outer cold shrink tubes 30. The cushion layer 17 provided in the inner cold shrink tube 20 was an acrylic foam tape having a thickness of 1.2 mm, and the cushion layer 17 provided in the outer cold shrink tube 30 was a butyl putty having a thickness of 1.5 mm. The acrylic foam tape having the 25% compressive stress of about 10 $N/cm^2$ and the compression set of about 52% was used. The butyl putty having the 25% compressive stress of about 10 $N/cm^2$, the shear strength of about 95 $N/cm^2$, and the compression set of about 100% was used.

Figure 9A:
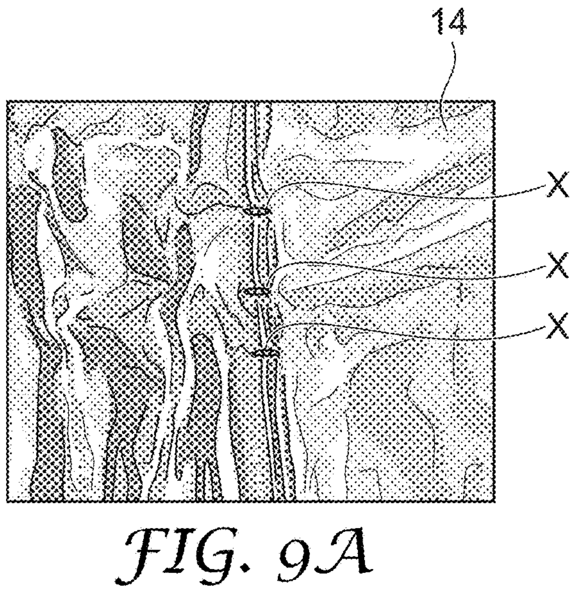
FIG. 9A is a drawing illustrating an experimental result of an impervious layer according to a comparative example.
Figure 9B:
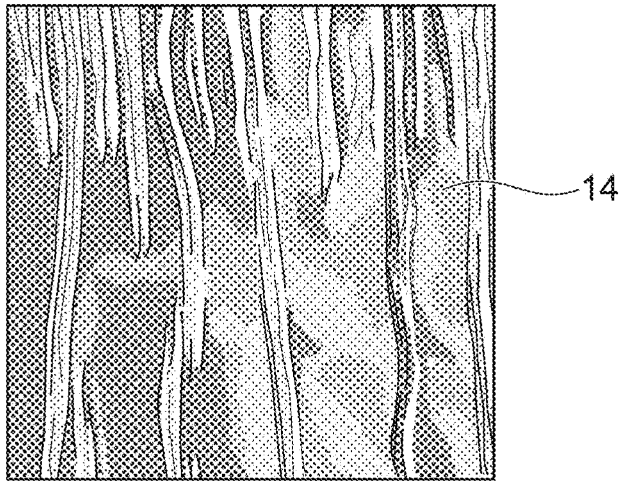
FIG. 9B and FIG. 9C are drawings illustrating experimental results of impervious layers according to examples.
Figure 9C:
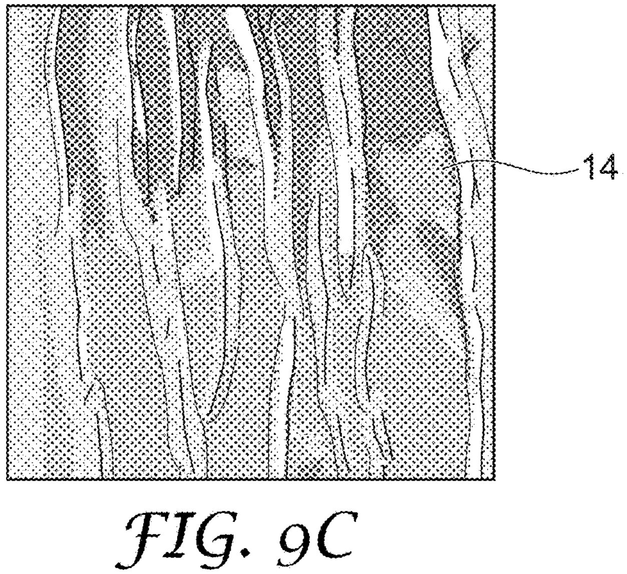

The cable connection structure 1 was manufactured by shrinking each of the above-described insulating tube 11, inner cold shrink tube 20, and outer cold shrink tube 30. The shrink ratio of the insulating tube 11 (the cold shrink tube 15) (the inner diameter after shrink/the inner diameter before shrink) was 90%, the shrink ratio of the inner cold shrink tube 20 was 80%, and the shrink ratio of the outer cold shrink tube 30 was 85% (on the insulating tube 11). In addition, by observing presence of a hole in each of the impervious layer 14 of the insulating tube 11, the impervious layer 14 of the inner cold shrink tube 20, and the impervious layer 14 of the outer cold shrink tube 30, presence of the effect of the cushion layer 17 was confirmed. FIG. 9A, FIG. 9B, and FIG. 9C illustrate the results.

FIG. 9A schematically illustrates a photograph of the impervious layer 14 of the insulating tube 11 without the cushion layer 17, FIG. 9B schematically illustrates a photograph of the impervious layer 14 of the inner cold shrink tube 20 including the cushion layer 17 as the acrylic foam tape, and FIG. 9C schematically illustrates a photograph of the impervious layer 14 of the outer cold shrink tube 30 including the cushion layer 17 as the butyl putty. The photographs in FIG. 9A, FIG. 9B, and FIG. 9C each illustrate the result of causing light to pass through the impervious layer 14. Furthermore, the portion of the impervious layer 14 shown in the photograph indicates a flat portion of the impervious layer 14 of no step difference.

As illustrated in FIG. 9A, it has been found that the impervious layer 14 of the insulating tube 11 without the cushion layer 17 generated creases in the vertical direction and creases in the lateral direction, and formed holes X at the intersection portions of the creases in the vertical direction and the creases in the lateral direction. On the other hand, as illustrated in FIG. 9B and FIG. 9C, when the cushion layer 17 as the acrylic foam tape was provided, and when the cushion layer 17 as the butyl putty was provided, creases were generated only in the vertical direction but were not generated in the two directions, and holes were not formed. Therefore, it has been found that with the impervious layer 14 to which the cushion layer 17 was bonded over the entire surface, formation of holes was able to be suppressed.

Bending Test

The bending test that bended the impervious layer 14 as the aluminum laminated film to confirm whether a hole was formed was conducted. The bending test was conducted on each of the impervious layer 14 without the cushion layer 17, the impervious layer 14 to which the cushion layer 17 as the acrylic foam was bonded, and the impervious layer 14 to which the cushion layer 17 as the butyl putty was bonded. FIG. 10A, FIG. 10B, FIG. 11A, FIG. 11B, and FIG. 11C illustrate the contents of bending test.

Figure 10A:
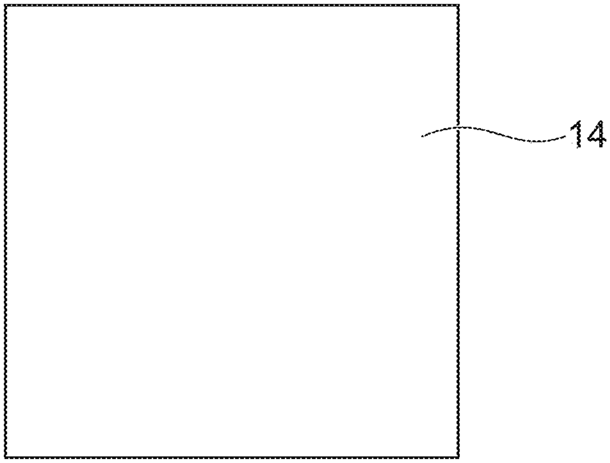
FIGS. 10A and 10B are drawings for describing a method of experiment of the impervious layer.
Figure 10B:
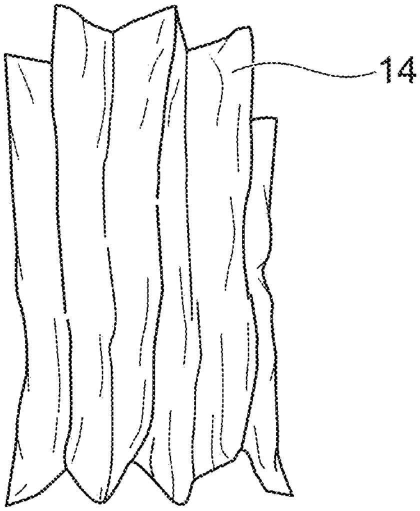
Figure 11A:
FIG. 11A, FIG. 11B, and FIG. 11C are drawings for describing the method of experiment of the impervious layer.
Figure 11B:
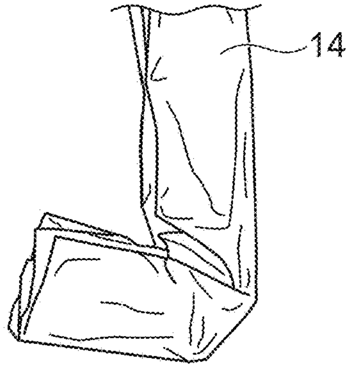

First, as illustrated in FIG. 10A and FIG. 10B, the impervious layer 14 having a rectangular shape at 90 mm×90 mm (and the impervious layer 14 to which the cushion layer 17 was bonded) were prepared, and each of the impervious layers 14 was bent such that five folding lines extending in the vertical direction were put on each of the impervious layers 14. As illustrated in FIG. 11A and FIG. 11B, a mountain fold was made in the lateral direction on one end (the upper end in FIG. 11A) of each of the impervious layers 14 in the vertical direction, and a mountain fold was made in the direction reverse to the above-described lateral direction (the left direction in FIG. 11B) on the other end (the lower end in FIG. 11B) of the impervious layer 14 in the vertical direction.

Figure 11C:
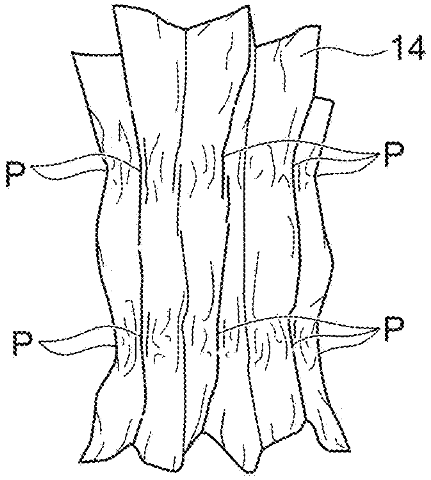

Thereafter, as illustrated in FIG. 11C, each of the mountain folds described above was restored, and whether a hole was formed in peaks P of the ten portions where the mountain folds were made was confirmed. Each of the three impervious layers 14 that did not include the cushion layers 17, the three impervious layers 14 to which the cushion layers 17 as the acrylic foam tapes were bonded, and the three impervious layers 14 to which the cushion layers 17 as the butyl putties were bonded were prepared to conduct the bending test described above on each of the impervious layers 14. The results are shown in Table 1 below.

TABLE 1

| | No. | Number of holes | Occurrence percentage of hole |
|---|---|---|---|
| No cushion layer (impervious layer only) | 1 | 3 | 30% |
| | 2 | 4 | 40% |
| | 3 | 3 | 30% |
| Cushion layer as acrylic foam tape | 1 | 1 | 10% |
| | 2 | 1 | 10% |
| | 3 | 0 | 0% |
| Cushion layer as butyl putty | 1 | 4 | 40% |
| | 2 | 4 | 40% |
| | 3 | 4 | 40% |

As shown in Table 1, it has been found that, in the bending test of the impervious layers 14, the number of holes and the occurrence percentage of hole were able to be reduced in the impervious layer 14 to which the cushion layer 17 as the acrylic foam tape was bonded, compared with the impervious layers 14 without the cushion layers 17. Specifically, among the ten peaks P, the portion where the hole was formed was able to be reduced to one or less and the occurrence percentage of hole was able to be reduced to 10% or less. Also, it has been found that the impervious layer 14 to which the cushion layer 17 as the acrylic foam tape was bonded was able to reduce the number of holes and the occurrence percentage of hole compared with the impervious layer 14 to which the cushion layer 17 as the butyl putty was bonded. It is considered because the butyl putty whose shear strength is not sufficiently high has high flowability, and when strong stress is applied, the butyl putty moves and the concentration of stress cannot be reduced.

Figure 12:
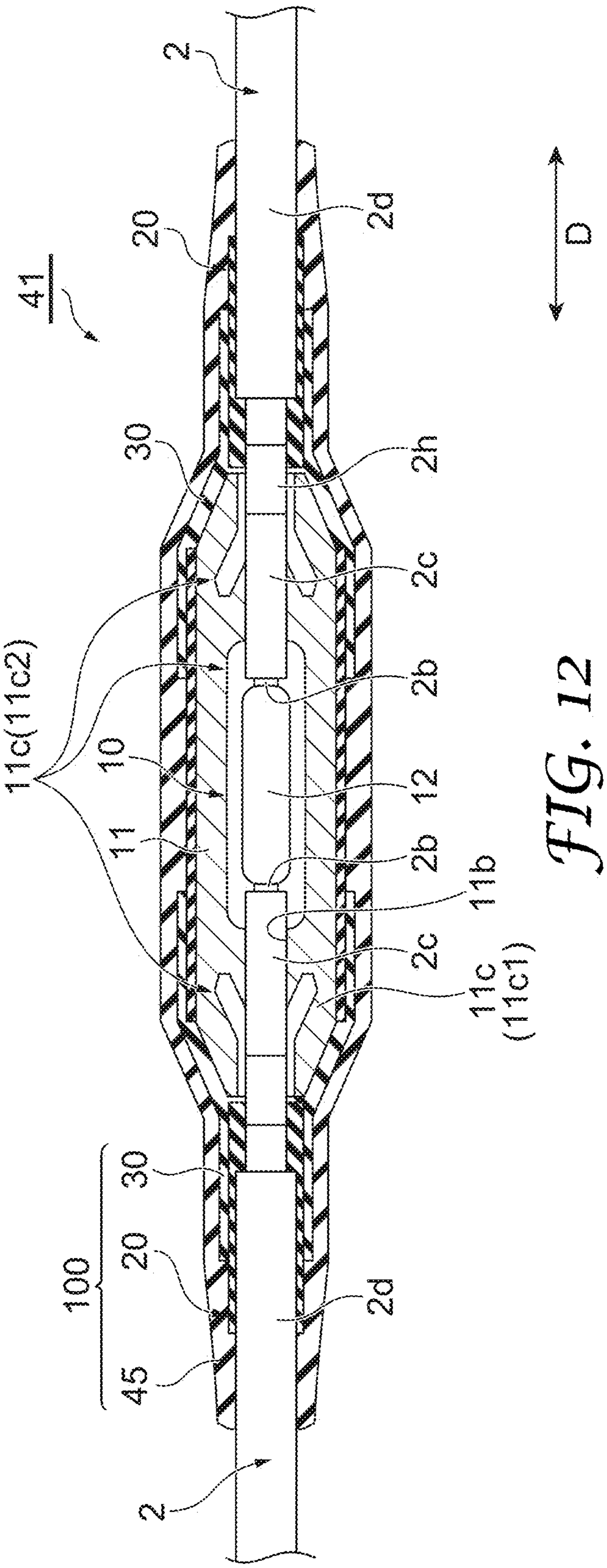
FIG. 12 is a cross-sectional view illustrating an example of a cable connection structure according to another embodiment.

Next, a cable connection structure 41 and a cable connection member 101 according to another embodiment will be described with reference to FIG. 12. A portion of the configuration of the cable connection structure 41 overlaps with a portion of the configuration of the cable connection structure 1 described above, and thus, the description that overlaps with the description described above will be omitted as appropriate. As illustrated in FIG. 12, the cable connection structure 41 and the cable connection member 101 include a sheath cover member 45 covering the outer cold shrink tubes 30 and the cable sheaths 2*d* of the cables 2.

Figure 13:
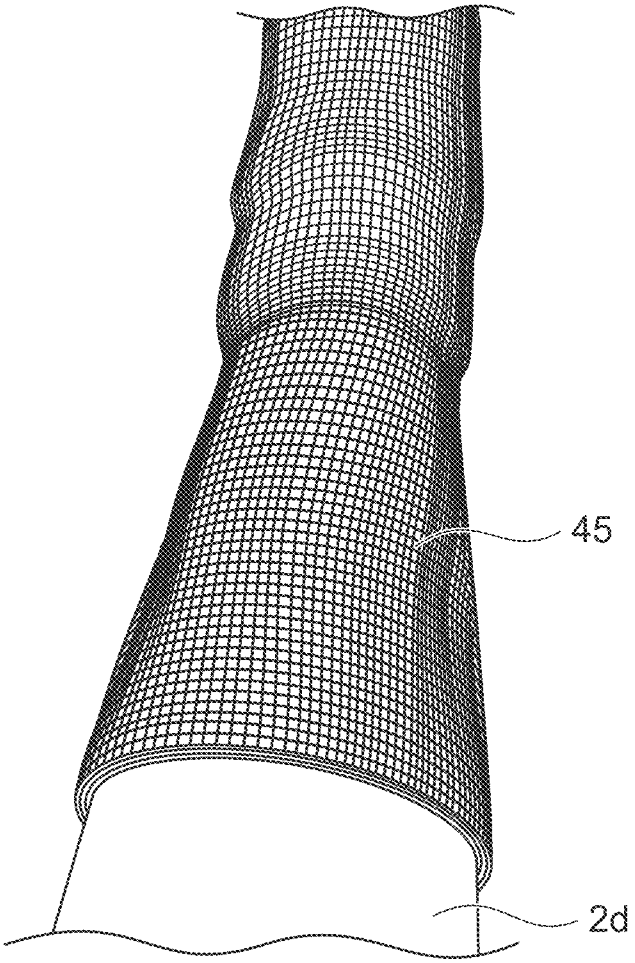
FIG. 13 is a perspective view illustrating a sheath cover member of the cable connection structure in FIG. 12.

FIG. 13 is a drawing schematically illustrating a portion of the sheath cover member 45. As illustrated in FIG. 12 and FIG. 13, the sheath cover member 45 is netlike, for example. The sheath cover member 45 is provided to suppress a phenomenon referred to as shrink back in which the cable sheath 2*d* shrinks. As an example, the sheath cover member 45 includes a glass cloth. For example, the sheath cover member 45 is constituted by a glass cloth impregnated with a resin (as an example, a polyurethane resin). The sheath cover member 45 may contain a polyurethane resin that cures with moisture. However, the material of the sheath cover member 45 is not particularly limited.

The sheath cover member 45, for example, is wrapped around the cable sheath 2*d* located on one side of the pair of cables 2 until the outer diameter of the sheath cover member 45 becomes approximately the same as the outer diameter of the outer cold shrink tube 30. After that, the sheath cover member 45 is wrapped around the inner cold shrink tubes 20 and the outer cold shrink tubes 30. The sheath cover member 45 is wrapped around the cable sheath 2*d* located on the other side of the pair of cables 2 until the outer diameter of the sheath cover member 45 becomes approximately the same as the outer diameter of the outer cold shrink tube 30. After that, the sheath cover member 45 is wrapped around the inner cold shrink tubes 20 and the outer cold shrink tubes 30.

Figure 14A:
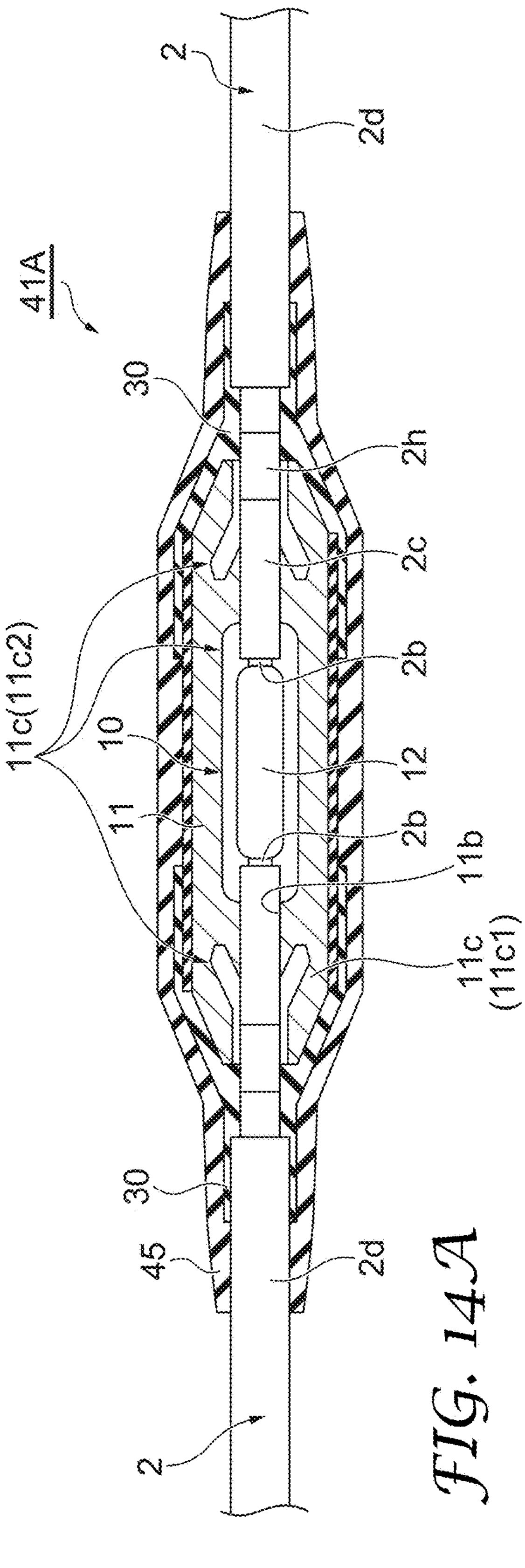
FIG. 14A and FIG. 14B are cross-sectional views illustrating cable connection structures according to modified examples.

FIG. 14A is a cross-sectional view illustrating a cable connection structure 41A according to a modified example that includes the sheath cover member 45. As illustrated in FIG. 14A, as long as the outer cold shrink tubes 30 sufficiently grips the cable sheaths 2*d*, even without the inner cold shrink tubes 20, shrink back can be more reliably suppressed using the sheath cover member 45.

Figure 14B:
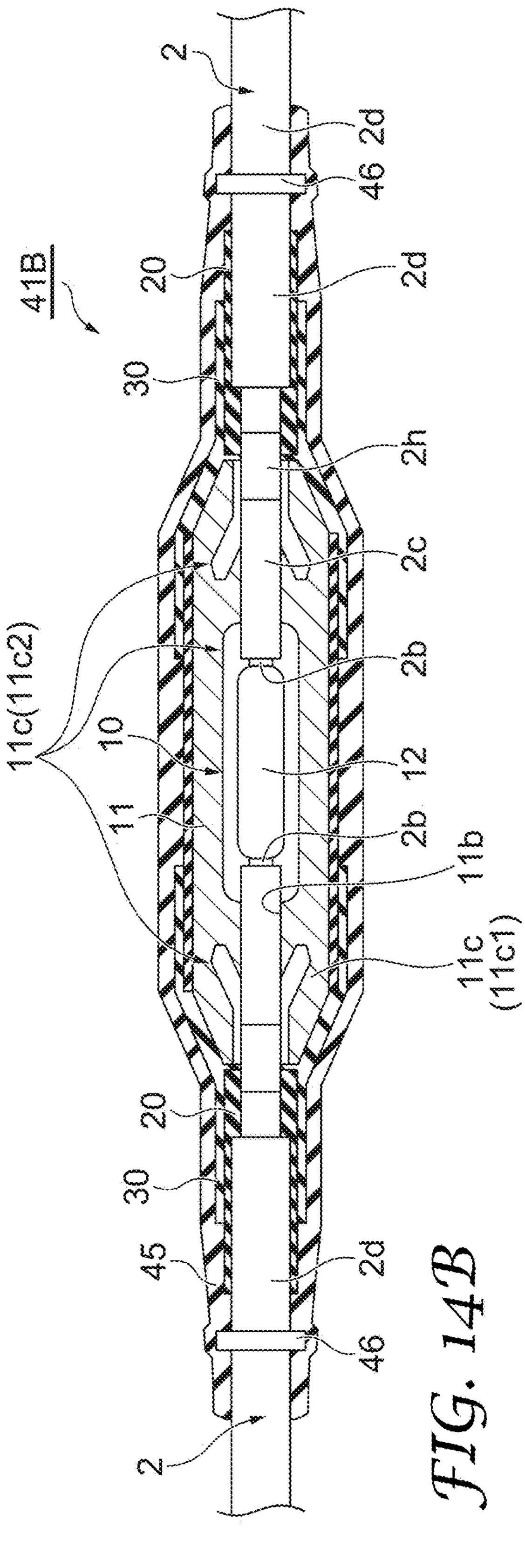

FIG. 14B is a cross-sectional view illustrating a cable connection structure 41B according to another modified example that includes the sheath cover member 45. As illustrated in FIG. 14B, the cable connection structure 41B includes band members 46 attached to the cable sheaths 2*d*. As an example, the cable connection structure 41B includes a pair of the band members 46 attached to the respective pair of cable sheaths 2*d*. For example, each band member 46 tightens the cable sheath 2*d* at the adjacent position of the inner cold shrink tube 20.

The band member 46 is attached to the cable sheath 2*d* inside the sheath cover member 45. Shrink back of the cable sheath 2*d* is more reliably suppressed with the band member 46. The band member 46 is a metallic metal band as an example. However, the band member 46 may be made of resin, and the material of the band member 46 is not particularly limited. For example, the band member 46 is elastically deformable and has a C-shape. In this case, the band member 46 can be easily attached to the cable sheath 2*d* from outside the cable sheath 2*d*. However, the band member 46 may have a shape other than the C-shape (for example, an O-shape), and the shape of the band member 46 is not particularly limited.

EXAMPLES

Next, the examples of the present embodiment will be described. Note that the present disclosure is not limited to the examples given below.

Verification of Shrink Back

Figure 15:
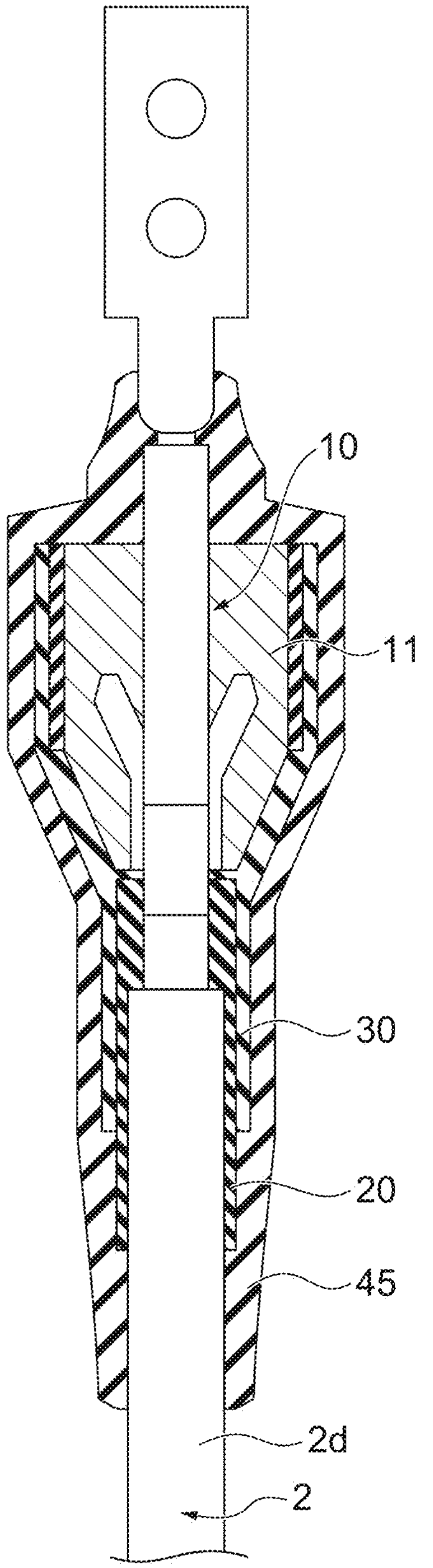
FIG. 15 is a drawing for describing an experiment of a cable connection structure according to another embodiment.

As illustrated in FIG. 15, the cable 2 was tightened with the inner cold shrink tube 20, and the cable connection portion 10 and the inner cold shrink tube 20 were tightened with the outer cold shrink tube 30. Then, with the inner cold shrink tube 20 facing downward, a weight was attached to the portion of the cable sheath 2*d* in the cable 2 extending downward from the inner cold shrink tube 20. In this state, a heat cycle test that performed cycles at 70° C. for 2 hours and at −20° ° C. for 2 hours by 30 times was conducted. An amount of positional deviation of the cable sheath 2*d* between before and after the heat cycle test was measured as an amount of extension of the length of the inner cold shrink tube 20 and the outer cold shrink tube 30. This measurement was performed on each of the following Examples 1 to 3. Specifications of each of Examples 1 to 3 will be described below.

Example 1

The conductor cross-sectional area of the cable 2 was configured to be 100 $mm^2$, and polyvinyl chloride (PVC) was used as the material of the cable sheath 2*d*. The weight of the weight described above was set to be 15 kg.

Example 2

The conductor cross-sectional area of the cable 2 was configured to be 100 $mm^2$, and polyethylene (PE) was used as the material of the cable sheath 2*d*. The weight of the weight described above was set to be 25 kg. The weight of the weight of Example 2 set to be larger than the weight of the weight of Example 1 is to reflect that the shrinkage force of PE is larger than the shrinkage force of PVC. The shrinkage force of PVC is 33.5 $g/mm^2$, and the shrinkage force of PE is approximately 1.5 times the shrinkage force of PVC. As described above, the PE had the shrinkage force of approximately 1.5 times the PVC, and thus the weight of the weight of Example 2 was approximately 1.5 times the weight of the weight of Example 1.

Example 3

The sheath cover member 45 was further wrapped around the outer cold shrink tube 30 and the cable sheath 2*d*. The conductor cross-sectional area of the cable 2 was configured to be 100 $mm^2$, and polyethylene (PE) was used as the material of the cable sheath 2*d*. The weight of the weight described above was set to be 25 kg.

The following Table 2 shows the results of measuring the amount of positional deviation of the cable sheath 2*d* in each of Examples 1 to 3 described above.

TABLE 2

| | Cross-sectional area of cable ($mm^2$) | Material of cable sheath | Weight of weight (kg) | Presence of sea wrap | Amount of positional deviation of cable sheath (mm) |
|---|---|---|---|---|---|
| Example 1 | 100 | PVC | 15 | No | 8 |
| Example 2 | 100 | PE | 25 | No | 19 |
| Example 3 | 100 | PE | 25 | Yes | 4 |

As shown in Table 2, in Example 1 in which the material of the cable sheath 2*d* was PVC, the amount of positional deviation of the cable sheath 2*d* was suppressed to 8 (mm) even in the absence of the sheath cover member 45. Note that since there is a concern that the amount of positional deviation of 20 (mm) or more breaks the shielding copper tape 2*f* of the cable 2 and causes a burning accident, the amount of positional deviation is required to be less than 20 (mm).

In Example 2 in which the material of the cable sheath 2*d* was the PE, in the absence of the sheath cover member 45, the amount of positional deviation of the cable sheath 2*d* was 19 mm, which was the value close to 20 mm. In contrast, it has been found that in Example 3 in which the sheath cover member 45 was wrapped around the cable sheath 2*d*, the amount of positional deviation of the cable sheath 2*d* was 4 mm. The deviation of the cable sheath 2*d* was able to be significantly reduced by the sheath cover member 45 and shrink back was able to be suppressed. Note that, in terms of environmental consideration, PE is preferably used for the material of the cable sheath 2*d* rather than the PVC. In Example 3, even when the cable 2 made of the environmentally friendly PE is used, shrink back can be more reliably suppressed by the sheath cover member 45.

Figure 16:
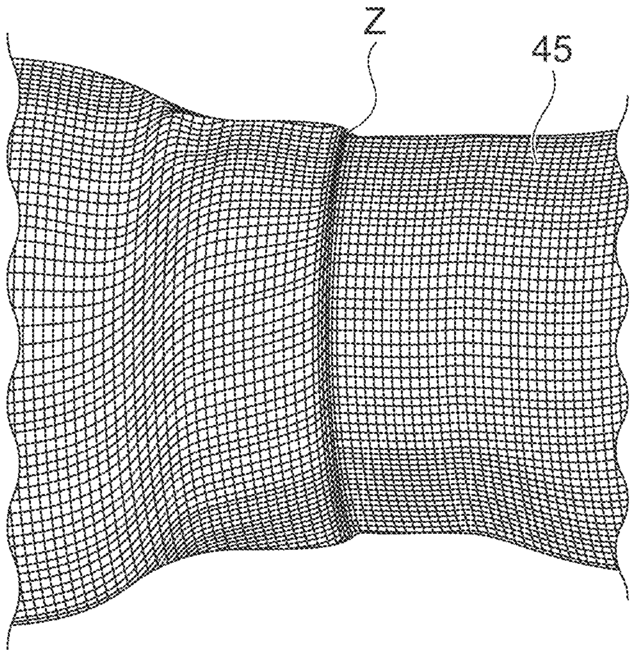
FIG. 16 is a drawing illustrating experimental results of a sheath cover member.

FIG. 16 is a drawing schematically illustrating the state of the sheath cover member 45 in Example 3. As illustrated in FIG. 16, it has been found that, in Example 3, the sheath cover member 45 bites into a step difference Z of the cable. Thus, by the sheath cover member 45 biting into the step difference Z to suppress deviation of the cable sheath 2*d*, shrink back of cable sheath 2*d* can be more reliably suppressed.

As described above, the cable connection structures 41, 41A, and 41B include the outer cold shrink tubes 30 and the sheath cover members 45 covering the cable sheaths 2*d* of the cables 2. Providing the sheath cover member 45 covering the cable sheaths 2*d* allows suppressing shrink back in which the cable sheath 2*d* shrinks.

The cable connection structure 41B includes the band members 46 attached to the cable sheaths 2*d* and located inside the sheath cover member 45. In this case, since the cable sheath 2*d* is held by the band member 46, shrink back of the cable sheath 2*d* can be more reliably suppressed. In addition, when the band member 46 holds the cable sheath 2*d*, one other than the cold shrink tube can be used as the cable connection portion 10, for example, a heat shrink tube can be used.

The various embodiments of the cable connection structure and the cable connection member according to the present disclosure have been described above. However, the present disclosure can be variously modified without departing from the subject matter recited in the claims. That is, the shape, size, number, and arrangement aspect of each portion of the cable connection structure and the cable connection member can be changed as appropriate within the scope not changing the gist described above. For example, in the embodiments described above, the impervious layer 14 in which the resins are laminated on both surfaces of the metal layer has been exemplified. However, the configuration of the impervious layer is not limited to this example, and, for example, an impervious layer in which a resin is laminated on one surface of a metal layer and a cushion layer (such as an acrylic foam tape) is stuck to the other one surface may be used, and the impervious layer is not particularly limited. Additionally, in the embodiments described above, the cable connection portion 10 including the insulating tube 11, the connector 12, and the semi-conductive tape 13 has been exemplified. However, the configuration of the cable connection portion is not limited to the examples described above, and can be changed as appropriate.

For example, in the above-described embodiments, the example in which the cable connection structure 1 includes the cable connection portion 10 that connects the pair of cables 2 together has been described. However, the cable connection structure may include a cable connection portion that connects a cable to a plurality of cables, or may include a cable connection portion that connects a cable to another device. Thus, the object to which the cable connection portion provided at the end portion of the cable is connected is not particularly limited.

What is claimed is:

1. A cable connection member comprising:
- a cold shrink tube;
- an impervious layer provided inside the cold shrink tube; and
- a cushion layer provided inside the cold shrink tube;
- wherein the cushion layer is configured by a foam tape and is bonded to an entire surface of the impervious layer.

2. The cable connection member according to claim 1, wherein the cushion layer has a thickness of 1 mm or more and 5 mm or less.

3. The cable connection member according to claim 1, wherein the cushion layer has a 25% compressive stress of 30 N/cm$^2$ or less.

4. The cable connection member according to claim 1, wherein a base material of the cushion layer has a shear strength of 150 N/cm$^2$ or more.

5. The cable connection member according to claim 1, wherein the cushion layer has a compression set of 80% or less.

6. The cable connection member according to claim 1, wherein the impervious layer is configured by a layered body of a metal and a resin.

7. The cable connection member according to claim 1, wherein the cold shrink tube constitutes an insulating tube of a cable connection portion attached to an end portion of a cable.

8. The cable connection member according to claim 1, wherein:
- the cushion layer is provided inside the cold shrink tube; and
- the impervious layer is provided inside the cushion layer.

9. The cable connection member according to claim 1, wherein:
- the cold shrink tube includes an inner layer and an outer layer located outside the inner layer; and
- the cushion layer and the impervious layer are provided between the inner layer and the outer layer.

10. A cable connection structure comprising
- an insulating tube of a cable connection portion attached to an end portion of a cable, wherein a cable connection member according to claim 1 constitutes the insulating tube.

11. The cable connection structure according to claim 10, comprising:
- an outer cold shrink tube covering at least a portion of the cable connection portion;
- a cushion layer provided inside the outer cold shrink tube; and
- an impervious layer provided inside the cushion layer.

12. The cable connection structure according to claim 11, comprising an inner cold shrink tube provided inside the outer cold shrink tube, wherein the inner cold shrink tube includes:
- an inner layer and an outer layer located outside the inner layer;
- an impervious layer provided between the inner layer and the outer layer; and
- a cushion layer provided between the outer layer and the impervious layer.

13. The cable connection structure according to claim 11, comprising a sheath cover member that covers the outer cold shrink tube and a cable sheath of the cable.

14. A cable connection structure comprising the cable connection portion of claim 1 attached to an end portion of a cable, the cable connection structure comprising a sheath cover member that covers a cable sheath of the cable and the cable connection portion.

15. The cable connection structure according to claim 14, comprising a band member attached to the cable sheath and located inside the sheath cover member.

* * * * *